United States Patent
Imura

(10) Patent No.: US 8,441,220 B2
(45) Date of Patent: May 14, 2013

(54) CONTROL DEVICE FOR ELECTRIC ROTATING MACHINE

(75) Inventor: Akihiro Imura, Chita-gun (JP)

(73) Assignee: Denso Corporation, Kariya (JP)

( * ) Notice: Subject to any disclaimer, the term of this patent is extended or adjusted under 35 U.S.C. 154(b) by 110 days.

(21) Appl. No.: 13/238,309

(22) Filed: Sep. 21, 2011

(65) Prior Publication Data

US 2012/0068641 A1 Mar. 22, 2012

(30) Foreign Application Priority Data

Sep. 21, 2010 (JP) ................................. 2010-210481

(51) Int. Cl.
*H02P 21/00* (2006.01)

(52) U.S. Cl.
USPC .................................. 318/400.02; 318/400.2

(58) Field of Classification Search ............. 318/400.02, 318/245, 254.1, 400.2
See application file for complete search history.

(56) References Cited

U.S. PATENT DOCUMENTS

| 6,756,760 B2 * | 6/2004 | Tanaka et al. ................. 318/560 |
| 2003/0030404 A1 | 2/2003 | Iwaji et al. |
| 2009/0160376 A1 * | 6/2009 | Yamada .................... 318/400.02 |
| 2009/0160377 A1 * | 6/2009 | Yamada .................... 318/400.02 |

FOREIGN PATENT DOCUMENTS

| JP | 3221686 | 8/2001 |
| JP | 2003-219678 | 7/2003 |
| JP | 2004-048868 | 2/2004 |
| JP | 3867518 | 10/2006 |
| JP | 2008-228419 | 9/2008 |
| JP | 4422875 | 12/2009 |
| JP | 2010-074902 | 4/2010 |

\* cited by examiner

*Primary Examiner* — Walter Benson
*Assistant Examiner* — Iftekhar Mustafa
(74) *Attorney, Agent, or Firm* — Nixon & Vanderhye PC

(57) ABSTRACT

A control device has a predicting unit for predicting a first current flowing through a motor in a next control period, at a predicting time during a predetermined period after a change of switching state in an inverter by using a current detected before the change and for predicting a second current of a control period later than the next control period by one control period by using the predicted first current, a determining unit for determining a next operating state of the inverter by using the predicted second current and an instructed value so as to reduce a change of switching state in the change of the operating state, and a control unit for controlling the inverter to be set in the determined operating state in the next control period and controlling the current of the motor depending on the operating state of the inverter.

7 Claims, 10 Drawing Sheets

| VOLTAGE VECTORS | SWITCHING ELEMENTS SET AT ON STATE | | |
|---|---|---|---|
| | U-PHASE | V-PHASE | W-PHASE |
| V0 | ESun | ESvn | ESwn |
| V1 | ESup | ESvn | ESwn |
| V2 | ESup | ESvp | ESwn |
| V3 | ESun | ESvp | ESwn |
| V4 | ESun | ESvp | ESwp |
| V5 | ESun | ESvn | ESwp |
| V6 | ESup | ESvn | ESwp |
| V7 | ESup | ESvp | ESwp |

NO PROHIBITION IN
CURRENT DETECTION

NUMBER OF
AVERAGE CHANGING TIMES
46700 $s^{-1}$
(PWM: 60000 $s^{-1}$)

20% REDUCTION
IN NUMBER OF
AVERAGE CHANGING TIMES

NUMBER OF
AVERAGE CHANGING TIMES
36893 $s^{-1}$
(PWM: 60000 $s^{-1}$)

CONTROL DEVICE FOR ELECTRIC ROTATING MACHINE

CROSS-REFERENCE TO RELATED APPLICATION

This application is based upon and claims the benefit of priority of the prior Japanese Patent Application 2010-210481 filed on Sep. 21, 2010, so that the contents of which are incorporated herein by reference.

BACKGROUND OF THE INVENTION

1. Field of the Invention

The present invention relates generally to a control device which controls switching elements of an electric power inverter circuit having connecting points, being connected with respective terminals of an electric rotating machine and being set at respective electric potentials different from one another, by changing an on (i.e., conductive) or off (i.e., non-conductive) state of selected switching elements to the off or on state and which controls a controlled variable of the electric rotating machine connected with the connecting points of the electric power inverter circuit.

The present invention relates more particularly to the control device which has a predicting unit that performs a prediction for the controlled variable of the electric rotating machine, on the assumption that the electric power inverter circuit is set in one of operating states to set the switching elements instates corresponding to the operating state, an operating state determining unit that determines one of the operating states of the electric power inverter circuit by using the predicted controlled variable and an instructed value of the controlled variable, and a control unit that controls the electric power inverter circuit to actually set the electric power inverter circuit in the determined operating state.

2. Description of Related Art

A control method for a three-phase motor receiving driving power through an inverter has been used. In this method, an operating state of the inverter is repeatedly switched or changed to another state to adjust an alternating current supplied to the motor and to control the motor. For example, a model predict ion control using a motor driving system has been proposed in Published Japanese Patent First Publication No. 2008-228419.

In this model prediction control, an alternating current flowing through a three-phase motor is predicted each time an inverter is set in one of various operating states, and the inverter is controlled to be set in an appropriate operating state in which a difference between the predicted current and an instructed current can be minimized. The value of the predicted current is predicted by using a detected value of an alternating current actually flowing through the motor as an initial value. In the model prediction control, the inverter is controlled so as to optimize a change in the current predicted based on an output voltage of the inverter. Therefore, in a transition period of time until the value of the instructed current becomes constant, the current outputted from the inverter can preferably follow the instructed current. Accordingly, the model prediction control can be useful for a control device of a motor generator requiring a high follow-up performance in a transition period as an on-board primary component.

When the operating state of the inverter is switched to another one every changing period, it is well known that ringing occurs generally in the current actually flowing through the three-phase motor. When the value of the current detected during a ringing occurring period is used to predict the current flowing through the motor, controllability for the motor is sometimes lowered. To prevent the controllability from being lowered, a control method using a motor driving device is proposed in Published Japanese Patent First Publication No. 2010-74902. In this control method, an alternating current flowing through a three-phase motor is detected when ringing generated in the current disappears.

However, in the model prediction control, a predicting period is required to perform the calculation for predicting the alternating current of the motor, and the precision in the control performed for the motor can be heightened when the changing period of the operating state is shortened. Therefore, when the detection of an alternating current flowing through the motor is stopped until ringing generated in the current disappears, it is difficult to perform the model prediction control at a high controllability for a three-phase motor.

SUMMARY OF THE INVENTION

An object of the present invention is to provide, with due consideration to the drawbacks of the conventional control method using a motor driving device or system, a control device which controls an electric rotating machine, receiving electric power through an electric power inverter circuit, at a high controllability for the rotating machine according to the model prediction control while suppressing the lowering of the controllability caused by a change of an operating state of the inverter circuit.

According to an aspect of this invention, the object is achieved by the provision of a control device for controlling a plurality of switching elements of an electric power inverter circuit having a plurality of connecting points, which are connected with respective terminals of an electric rotating machine and are set at respective electric potentials different from one another, by selecting one switching element or more from the switching elements and by changing states of the selected switching elements and for controlling a control led variable of the electric rotating machine. The control device comprises a predicting unit that performs a prediction for the controlled variable of the electric rotating machine when the electric power inverter circuit is set in one of a plurality of operating states to set the switching elements in states corresponding to the operating state, an operating state determining unit that determines one of the operating states of the electric power inverter circuit as a determined operating state by using the predicted controlled variable and an instructed value of the controlled variable, and a control unit that controls the electric power inverter circuit to actually set the electric power inverter circuit in the determined operating state.

The predicting unit sets a value of the controlled variable, actually detected from the electric rotating machine, or a value of a physical quantity, from which the value of the control variable can be obtained and which is actually detected from the electric rotating machine, as an initial value to predict a first value of the controlled variable or the physical quantity on the basis of the initial value as an input parameter in the operating state determination of the operating state determining unit. The predicting unit predicts the first value of the controlled variable or the physical quantity as the input parameter in a predetermined period of time, starting at a time when one operating state set in the electric power inverter circuit is changed to another operating state, by using a second value of the control led variable or the physical quantity, which has been predicted based on a value of the controlled variable or the physical quantity detected before the change of the operating state set in the electric power inverter circuit, as the initial value.

With this structure of the control device, when one operating state set in the electric power inverter circuit is changed to another operating state, ringing is sometimes generated in the controlled variable or the physical quantity of the electric rotating machine during the predetermined period of time starting at the change time the operating state. To suppress the influence of the ringing on the precision of the controlled variable, during the predetermined period of time starting at a time when one operating state set in the electric power inverter circuit is changed to another operating state, the value of the controlled variable or the physical quantity already predicted based on the value of the controlled variable or the physical quantity detected before the change of the operating state is used, in place of the value of the controlled variable or the physical quantity detected during the predetermined period of time, as the initial value for the prediction of the controlled variable or the physical quantity acting as the input parameter in the operating state determination of the operating state determining unit.

Accordingly, even when the ringing is generated in the controlled variable or the physical quantity of the electric rotating machine, the controlled variable or the physical quantity can be predicted without being influenced by the ringing, the precision in the prediction can be heightened, and the controllability of the control device for the electric rotating machine can be heightened.

DETAILED DESCRIPTION OF THE PREFERRED EMBODIMENTS

Figure 1:
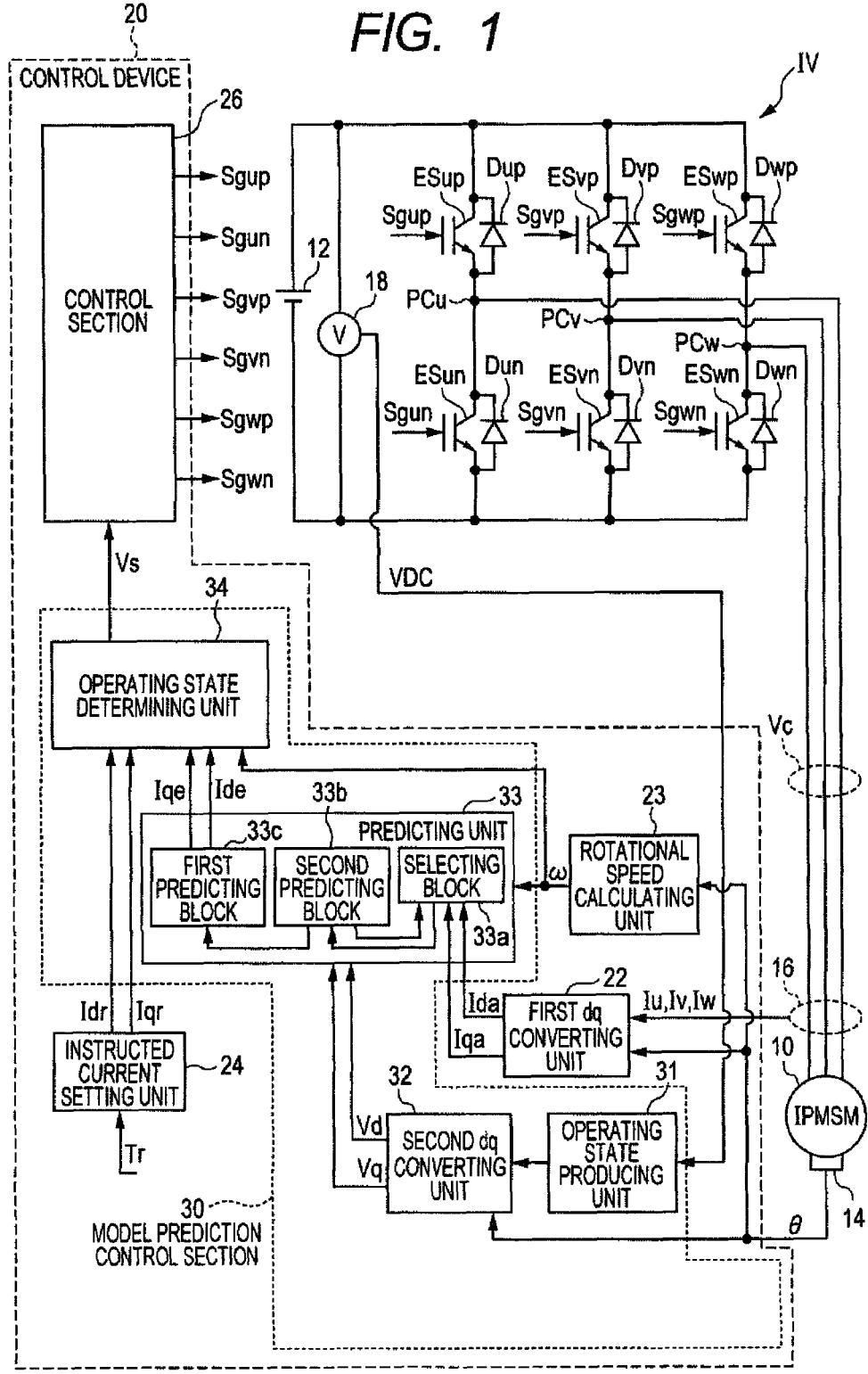
FIG. 1 is a view showing the structure of a control system having a control device according to the first embodiment of the present invention.

Embodiments of the present invention will now be described with reference to the accompanying drawings, in which like reference numerals indicate like parts, members or elements throughout the specification unless otherwise indicated.

First Embodiment

FIG. 1 is a view showing the structure of a control system having a control device for an electric rotating machine according to the first embodiment. As shown in FIG. 1, a control system has a high voltage battery 12 outputting electric power of a high direct current (dc) voltage as a direct current power source, an inverter IV set in one of various operating states to convert the power of the battery 12 into electric power of a three-phase alternating current (ac) voltage corresponding to the operating state, a motor generator 10 receiving the power through the inverter IV as an electric rotating machine to generate a torque (or a rotational force), and a control device 20 for receiving a target torque Tr, receiving detection values from various sensors detecting specific controlled variables of the motor generator 10 or physical values by which values of the specific controlled variables can be calculated, and adjusting a change of the operating state of the inverter IV according to the target torque Tr and the detection values of the specific controlled variables to control controlled variables of the motor generator 10 such that the motor generator 10 appropriately generates a torque matching with the target torque Tr.

The motor generator 10 is a three-phase interior permanent magnet synchronous motor (IPMSM). This generator 10 has a rotor, permanent magnets having salient poles and being disposed around a shaft of the rotor so as to be protruded from the shaft, a stator surrounding the rotor, and three windings (i.e., a U phase winding, a V phase winding and a W phase winding) wound on the stator. The generator 10 is an on-boarded primary component of a vehicle, and the shaft of the generator 10 is mechanically connected with driving wheels of the vehicle to rotate the wheels by using the generated torque. Three terminals of the generator 10 are connected with the battery 12 through the inverter IV.

The inverter IV has a plurality of switching elements and a plurality of connecting points Pcu, PCv and PCw which are connected with the respective terminals of the generator 10 and are set at respective electric potentials different from one another by the switching elements. The switching elements are arranged so as to be able to connect each of the terminals of the generator 10 with any of a positive electrode and a negative electrode of the battery 12. The control device 20 selects two switching elements or more from the switching elements and changes the state of each selected switching element to another one to control phase currents (i.e., controlled variables) flowing through the terminals of the generator 10.

More specifically, the inverter IV has U phase switching elements ESup and ESun serially connected with each other at a U phase connecting point Pcu as a U phase serial connection member, V phase switching elements ESvp and ESvn serially connected with each other at a V phase connecting point PCv as a V phase serial connection member, and W phase switching elements ESwp and Swn serially connected with each other at a W phase connecting point PCw as a W phase serial connection member. Emitters of the switching elements ESup, ESvp and ESwp are connected with collectors of the respective switching elements ESun, ESvn and ESwn. Collectors of the switching elements ESup, ESvp and ESwp are connected with the higher voltage terminal of the battery 12, while emitters of the switching elements ESun, ESvn and ESwn are connected with the lower voltage terminal of the battery 12. The connecting points of these serial connection members are connected with a U phase terminal, a V phase terminal and a W phase terminal of the generator 10, respectively. Each of the switching elements ESup, Esun, Esvp, Esvn, ESwp and Swn is made of an n-p-n insulated-gate bipolar transistor (IGBT).

The inverter IV further has a plurality of diodes Dup, Dun, Dvp, Dvn, Dwp and Dwn connected with the respective switching elements ESup, Esun, Esvp, Esvn, ESwp and Swn in parallel. The anode of each diode is connected with the emitter of the corresponding switching element. Therefore, the direct ion of a current allowed to flow through each diode is opposite to the direction of a current possible to flow through the corresponding switching element. Each diode acts as a freewheel diode.

The control device 20 constitutes a low voltage system. More specifically, although the inverter IV and the motor generator 10 are ope rated by using electric power of a high voltage, the control device 20 is operated by using electric power of a low voltage. The control system further has various sensors such as a voltage sensor 18 for detecting a supply voltage VDC of the battery 12 applied to the inverter IV, a current sensor 16 for detecting phase currents Iu, Iv and Iw flowing through the terminals of the generator 10, and a rotational angle sensor 14 for detecting a rotational angle θ of the rotor of the generator 10. The control device 20 receives detected values of these sensors 14, 16 and 18 through an interface (not shown).

The control device 20 produces control signals Sgup, Sgun, Sgvp, Sgvn, Sgwp and Sgwn every control period Tc according to the received detected values and the target torque Tr and transmits the signals Sgup, Sgun, Sgvp, Sgvn, Sgwp and Sgwn to bases of the respective switching elements ESup, Esun, Esvp, Esvn, ESwp and Eswn of the inverter IV. The inverter IV converts the power of the supply voltage VDC into the power of a controlled voltage Vc according to the control signals every control period Tc.

The control device 20 controls the switching elements of the inverter IV to changeably connect each terminal of the generator 10 with the positive or negative electrode of the battery 12. The control device 20 performs a control of controlled variables of the generator 10 according to a model prediction method and performs a method of obtaining an initial value for the prediction of the controlled variables in the control of the controlled variables.

A control of controlled variables according to a model prediction method will be described.

The control device 20 operates the inverter IV to indirectly control a torque actually produced in the generator 10 to the target torque Tr. More specifically, the device 20 operates the inverter IV to directly control the alternating current, actually flowing through the generator 10, to an instructed current. This instructed current is required for the generator 10 to generate the target torque Tr. That is, in this embodiment, although the device 20 controls the torque generated in the generator 10 as a final controlled variable, the device 20 directly controls a current, actually flowing through the generator 10, to the instructed current to control the torque generated in the generator 10.

The inverter IV can be set in any of a plurality of operating states. Each operating state corresponds to a pattern of on and off states of the switching elements ESup, Esun, Esvp, Esvn, ESwp and Eswn of the inverter IV. A voltage vector of the controlled voltage Vc applied from the inverter IV to the generator 10 depends on the operating state set in the inverter IV. To control the current (i.e. a controlled variable), actually flowing through the generator 10, to the instructed current for the purpose of controlling the torque (i.e., an ultimate controlled variable) actually generated in the generator 10 to the target torque Tr, on condition that the inverter IV is supposedly set in one operating state, the device 20 predicts a current (i.e., a controlled variable) flowing through the generator 10 from the detected value (i.e., an input parameter) of the sensor 16, the detected values of the sensors 14 and 18 and the instructed current (i.e., an input parameter), and determines an operating state to be actually set in the inverter IV on the basis of a difference between the predicted current and the instructed current. This control is called a model prediction control in this specification.

This model prediction control will be described in more detail. The control device 20 has a first dq converting unit 22 for converting phase currents Iu, Iv and Iw detected in the sensor 16 into an actual current Idqa composed of an actual d-axis current Ida and an actual q-axis current Iqa defined on a dq rotational coordinate system by using the rotational angle θ of the sensor 14, a rotational speed calculating unit 23 for performing a differential calculation for a rotational angle θ detected in the sensor 14 with respect to time to obtain an electrical angle rotational speed ω of the rotor of the generator 10, and an instructed current setting unit 24 for setting an instructed current Idqr composed of an instructed d-axis current Idr and an instructed q-axis current Iqr corresponding to the target torque Tr on the dq rotational coordinate system such that a maximum torque can be generated from a minimum current in the generator 10.

The control device 20 further has a model prediction control section 30 for determining a specific voltage vector Vs, corresponding to a specific operating state of the inverter IV, as a next voltage vector of a next control period every control period Tc from input parameters such as the actual currents Id and Iq, the instructed currents Idr and Iqr, the rotational speed ω, the rotational angle θ and the supply voltage VDC, and a control section 26 for producing control signals Sgup, Sgun, Sgvp, Sgvn, Sgwp and Sgwn from the voltage vector Vs determined by the section 30 every control period Tc and supplying the control signals to the inverter IV such that the inverter IV is set in the specific operating state corresponding to the voltage vector Vs and outputs the controlled voltage Vc to the generator 10.

The dq rotational coordinate system is rotated with the rotor of the generator 10. The d-axis of the coordinate system is set so as to be directed from one S magnetic pole to the corresponding N magnetic pole in the rotor. The q-axis of the coordinate system is set to be orthogonal to the d-axis on a plane perpendicular to the rotation axis of the rotor. The original point of this system is placed on the rotation axis of the rotor.

With this structure of the control device 20, the alternating current (i.e., phase currents) of the generator 10 is set as a controlled variable. Because the control device 20 controls the generator 10 such that the phase currents Iu, Iv and Iw of the generator 10 is adjusted to the instructed current Idqr, the controlled variable is directly controlled.

In the operation of the control device 20, phase currents Iu, Iv and Iw detected in the sensor 16 are converted into an actual d-axis current Ida and an actual q-axis current Iqa in the unit 22, a rotational speed ω of the rotor of the generator 10 is obtained from a rotational angle θ detected in the sensor 14 in the unit 23, and an instructed d-axis current Idr and an instructed q-axis current Iqr corresponding to the target torque Tr is set in the unit 24 so as to generate a maximum torque from a minimum current in the generator 10. In the control section 30, a specific voltage vector Vs is determined from the actual currents Id and Iq, the instructed currents Idr and Iqr, the rotational speed ω, the rotational angle θ and the supply voltage VDC. In the section 26, control signals Sgup, Sgun, Sgvp, Sgvn, Sgwp and Sgwn are produced from the voltage vector Vs and are supplied to the inverter IV. Therefore, the inverter IV is set in the operating state corresponding to the specific voltage vector Vs, and the inverter IV applies the controlled voltage Vc to the generator 10.

Figures 2A, 2B:
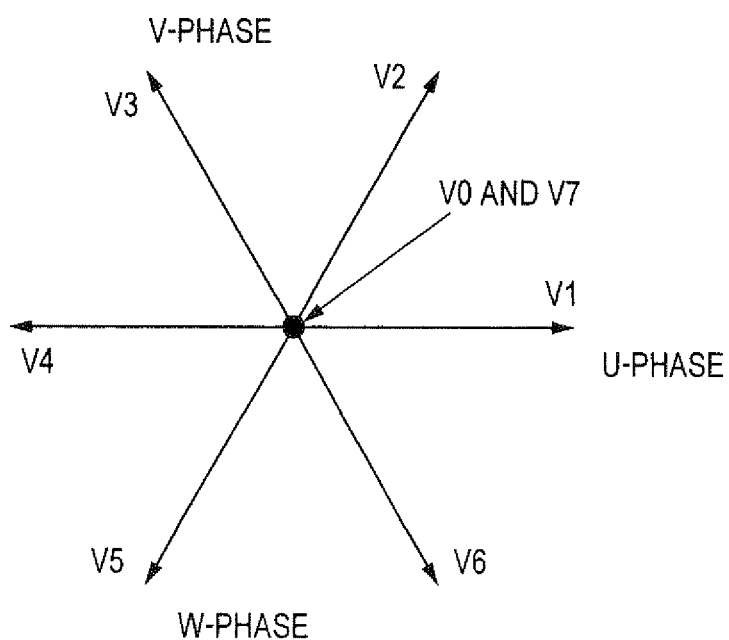
FIG. 2A shows eight voltage vectors corresponding to eight operating states of an inverter shown in FIG. 1.
FIG. 2B shows directions and magnitudes of the voltage vectors.

FIG. 2A shows eight voltage vectors corresponding to eight operating states of the inverter IV, while FIG. 2B shows directions and magnitudes of the voltage vectors. As shown in FIG. 2A, the controlled voltage Vc can have any of eight voltage vectors Vi (i=0, 1, . . . , 7) corresponding to eight operating states of the inverter IV. For example, when the switching elements Esun, Esvn and Eswn on the lower electric potential side are set in the on state while the switching elements Esup, Esvp and Eswp on the high electric potential side are set in the off state, the control voltage Vc has the voltage vector V0. When the switching elements Esup, Esvp and Eswp are set in the on state while the switching elements Esun, Esvn and Eswn are set in the off state, the controlled voltage Vc has the voltage vector V7. In the case of the voltage vectors V0 and V7, all phases of the generator 10 are short-circuited, so that the controlled voltage Vc is set at zero. Therefore, each of the voltage vectors V0 and V7 is called a zero voltage vector. In contrast in the case of the voltage vectors V1 to V6, at least one of the switching elements Esun, Esvn and Eswn and at least one of the switching elements Esup, Esvp and Eswp are set in the on state, so that the controlled voltage Vc has magnitudes larger than zero. Therefore, each of the voltage vectors V1 to V6 is called an effective voltage vector.

A switching state of the U phase is determined by a pattern of states of the switching elements Esup and Esun, a switching state of the V phase is determined by a pattern of states of the switching elements Esvp and Esvn, and a switching state of the W phase is determined by a pattern of states of the switching elements Eswp and Eswn. When the states of the switching elements Esup and Esun are changed in response to the operating state newly set in the inverter IV, the switching state of the U phase is changed. When the states of the switching elements Esvp and Esvn are changed, the switching state of the V phase is changed. When the states of the switching elements Eswp and Eswn are changed, the switching state of the W phase is changed.

As shown in FIG. 2B, the effective voltage vectors V1 to V6 are expressed on the fixed two-dimensional coordinate system while placing the zero voltage vectors V0 and V7 at the original point of this coordinate system. The voltage vector V1 obtained by setting only the switching element Esup in the on state is directed toward the U phase and has a positive value, the voltage vector V3 obtained by setting only the switching element Esvp in the on state is directed toward the V phase and has a positive value, and the voltage vector V5 obtained by setting only the switching element Eswp in the on state is directed toward the W phase and has a positive value.

The operation basically performed in the control section 30 will be described in detail.

As shown in FIG. 1, the control section 30 has an operating state producing unit 31 for producing the voltage vectors V0 to V7 from the value of the supply voltage VDC and outputting the voltage vectors V0 to V7, corresponding to respective operating states of the inverter IV, one after another every control period Tc. Each voltage vector is defined on the UVW phases coordinate system. A phase component of the voltage vector is expressed by the value VDC/2 when the corresponding switching element Esup, Esvp or Eswp is set in the on state, while the phase component of the voltage vector is expressed by the value −VDC/2 when the corresponding switching element Esun, Esvn or Eswn is set in the on state. For example, the voltage vector V0 is expressed by (−VDC/2, −VDC/2, −VDC/2), and the voltage vector V1 is expressed by (VDC/2, −VDC/2, −VDC/2).

The control section 30 further has a second dq converting unit 32 for converting each of the voltage vectors V0 to V7 produced in the producing unit 31 into a voltage vector (Vd, Vq) of the controlled voltage Vc, defined on the dq rotational coordinate system, by using the rotational angle θ.

The control section 30 further has a predicting unit 33 with a current selecting block 33a, a second predicting block 33b and a first predicting block 33c. The second predicting block 33b predicts an alternating current Idqe(n+1), composed of a d-axis current Ide(n+1) and a q-axis current Iqe(n+1) of the next control period Tc(n+1), in the present control period Tc(n) every control period Tc. The selecting unit 33a receives the actual current Idqa(Ida, Iqa) from the converting unit 22 and receives the predicted current from the second predicting block 33b every control period Tc. When a predetermined period of time Tth has elapsed after a change in at least one switching state of the inverter IV, the selecting unit 33a selects the actual current Idqa as a voltage determining current Idq composed of voltage determining current components Id and Iq. In contrast, when the predetermined period of time Tth is not yet elapsed after a change in at least one switching state of the inverter IV, the selecting unit 33a selects an alternating current Idqe(n) composed of a d-axis current Ide(n) and a q-axis current Iqe(n), already predicted in the second predicting block 33b in the preceding control period Tc(n−1), as a voltage determining current Idq composed of voltage determining current components Id and Iq. The role of the selecting unit 33a in the control device 20 will be described later in detail.

The predicting unit 33 predicts an alternating current Idqe of a first control period, on the assumption that the inverter IV is set in one operating state corresponding to one voltage vector produced in the producing unit 31, in a second control period earlier than the first control period by the time length of one control period by using the voltage vector (Vd, Vq) of the converting unit 32, the current Idq (Id, Iq) of the selecting block 33a, and the rotational speed ω of the calculating unit 23 each time the selecting unit 32 selects one of the voltage vectors.

In this current prediction, the voltage vector (Vd, Vq) is expressed by voltage equations (c1) and (c2).

$$Vd=(R+pLd)Id-\omega \cdot Lq \cdot Iq \tag{c1}$$

$$Vq=\omega \cdot Ld \cdot Id+(R+pLq)Iq+\omega \cdot \phi \tag{c2}$$

The variables Vd and Vq denote a d-axis voltage component and a q-axis voltage component of the controlled voltage Vc applied to the generator 10, the variables Id and Iq denote a d-axis current and a q-axis current actually flowing through the generator 10, the parameter R denotes the resistance of the armature winding, the parameters Ld and Lq denote the d-axis inductance and the q-axis inductance, and the parameter ϕ is a constant of armature winding linkage magnetic fluxes. A differential operator p (i.e., d/dt) with respect to time is used.

A differential equation (c3) expressing a differential term pId of the d-axis current Id is obtained as a state equation by rearranging the terms of the equation (c1), and a differential equation (c4) expressing a differential term p Iq of the q-axis current Iq is obtained as a state equation by rearranging the terms of the equation (c1).

$$pID=-(R/Ld)Id+\omega(Lq/Ld)Iq+Vd/Ld \tag{c3}$$

$$pIq=-\omega(Ld/Lq)Id-(R/Lq)Iq+Vq/Lq-\omega\phi/Lq \tag{c4}$$

The combination of the equations (c3) and (c4) is expressed as follows:

$$\frac{d}{dt}\begin{pmatrix}Id\\Iq\end{pmatrix}=\begin{pmatrix}-\frac{R}{Ld}&\omega\frac{Lq}{Ld}\\-\omega\frac{Ld}{Lq}&-\frac{R}{Lq}\end{pmatrix}\begin{pmatrix}Id\\Iq\end{pmatrix}+\begin{pmatrix}\frac{1}{Ld}&0\\0&\frac{1}{Lq}\end{pmatrix}\begin{pmatrix}Vd\\Vq\end{pmatrix}+\begin{pmatrix}0\\-\frac{\omega\phi}{Lq}\end{pmatrix}$$

From the currents Id and Iq selected in the selecting block 33a and the voltages Vd and Vq actually applied to the generator 10, the predicting unit 33 predicts currents Ide and Iqe expected to flow through the generator 10 on the assumption that the controlled voltage Vc=(Vd, Vq) is applied to the generator 10, according to the equations (c3) and (c4). The predicting unit 33 predicts currents Ide and Iqe for each of the voltage vectors V0 to V7 determined in the unit 31 every control period Tc.

The control section 30 further has an operating state determining unit 34 for determining a level of estimation based on an estimating function J for each of the voltage vectors V0 to V7 produced in the producing unit 31 and determining one voltage vector corresponding to the highest level of estimation as an optimum voltage vector Vs corresponding to an optimum operating state, to be actually set in the inverter IV, every control period Tc. Each time one voltage vector is produced in the producing unit 31, a value of the function J for the voltage vector is calculated by using the predicted currents Ide and Iqe of the predicting unit 33 and the instructed currents Idr and Iqr of the setting unit 24.

More specifically, the value of the function J (Edq) is indicated by the squared magnitude (i.e., inner product value) $Edq^2=(Idr-Ide)^2+(Iqr+Iqe)^2$ of the current difference vector (i.e., an error vector) Edq(Idr−Ide, Iqr−Iqe) between the instructed current vector Idqr(Idr, Iqr) and the predicted current vector Idqe(Ide,Iqe). Although each component of the current difference vector becomes positive or negative, the squared magnitude is always positive. In this case, the value of the function J can be increased with the difference between the vectors Idqr and Idqe. That is, the estimation level is lowered with the increase of the value of the function J. In this case, the function J can be defined such that the estimation level is lowered with the increase of the difference in each component between the vectors Idqr and Idqe. Therefore, when the value of the function J for one voltage vector produced in the producing unit 31 is minimized among values of the function J for the voltage vectors V0 to V7, the determining unit 34 determines this voltage vector of the minimized value as an optimum voltage vector Vs corresponding to an optimum operating state to be set in the inverter IV.

Because the function J is used to determine the optimum voltage vector Vs, the control device 20 can select the optimum operating state of the inverter IV so as to minimize the difference between the instructed current vector Idqr and the predicted current vector Idqe. This determination is performed every control period Tc. However, because the optimum operating state is determined in a local time scale corresponding to one control period Tc, the changing frequency of switching states corresponding to respective phases is sometimes increased. The switching state of each phase indicates a pattern of on or off states set in two switching elements of the phase in the inverter IV. The increase of the changing frequency causes ringing in the phase currents flowing through the generator 10 at a high frequency. In this case, controllability of the control device 20 for the switching elements of the inverter IV and the generator 10 is sometimes lowered.

To suppress the lowering of the controllability in the model prediction control, the control device 20 selects the optimum operating state every control period Tc while referring to or using an average voltage vector Va. The average voltage vector Va denotes a voltage only having a fundamental wave component of the controlled voltage Vc outputted from the inverter IV, and this fundamental wave component has an electrical angle frequency. When the inverter IV changes the state of each switching element every period of time shorter than an electrical angle period corresponding to one electrical angle frequency, a controlled voltage Vc imitating a voltage, which has a component of the electrical angle frequency and has a sinusoidal wave shape, is obtained in the inverter IV. The voltage having the imitated sinusoidal wave shape is the average voltage vector Va. The norm of the average voltage vector Va is a physical value which is proportional to a modulation factor expressed by percentage or a voltage utilization factor. The modulation factor denotes a Fourier coefficient of the fundamental wave component contained in the controlled voltage Vc. When this Fourier coefficient is calculated, the amplitude center of the fundamental wave component is set to be equal to the central value in the changing width of the controlled voltage Vc.

The inventor of this application found out that the average voltage vector Va is appropriate to control the alternating current actually flowing through the generator 10 to the instructed current Idqr(Idr, Iqr). Therefore, when the control device 20 refers to or uses the average voltage vector Va, the control device 20 can selects an optimum operating state in a time scale longer than the control period Tc in the model prediction control without lengthening a period of time required to predict the current flowing through the generator 10.

More specifically, in this embodiment, while using the average voltage vector Va, the control device 20 sets a changing pattern of switching states in a triangular wave comparison PWM (pulse width modulation) control as a normative changing pattern in the model prediction control.

Next, an operation especially performed in the control device 20 to suppress the lowering of the controllability in the model prediction control will be described with reference to FIG. 3 to FIG. 9.

Figure 3:
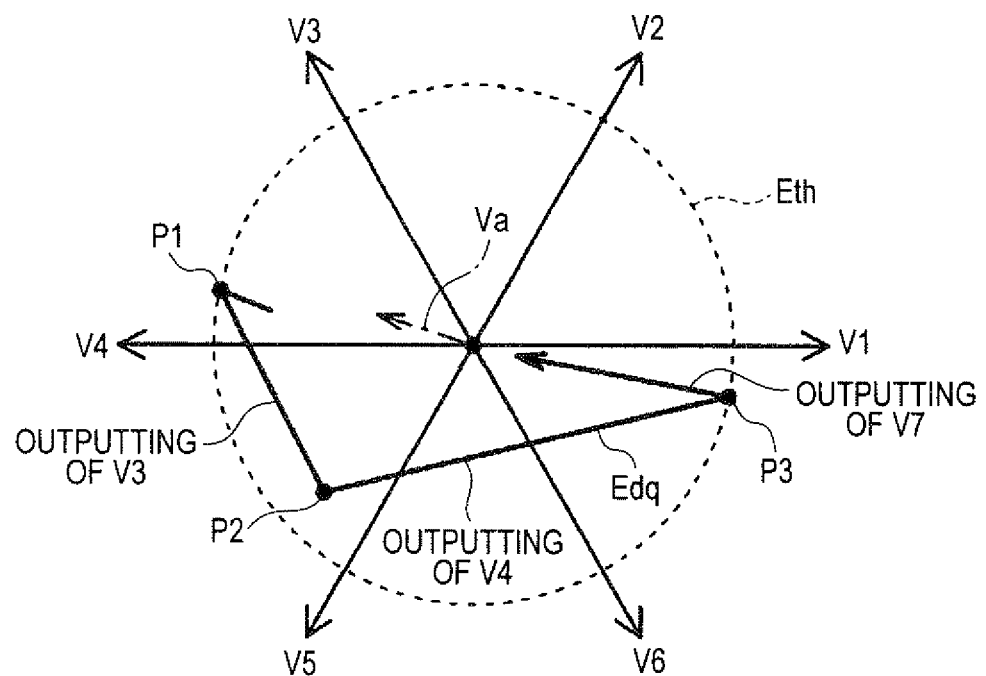
FIG. 3 shows a transition of the operating state preferentially selected in a model prediction control according to the first embodiment.

FIG. 3 shows a transition of the operating state preferentially selected in the model predict ion control. As shown in FIG. 3, a differential vector between the instructed current vector Idqr and the predicted current vector Idqe is defined as a vector Edq indicating a current error. When the current error (i.e., the norm of the vector Edq) is placed at a point P1 so as to exceed an allowable range indicated by a threshold Eth, the determining unit 34 of the control device 20 selects the voltage vector V3 from the effective voltage vectors V3 and V4 which form smaller angles with the average voltage vector Va (i.e., angles between the vector Va and the vectors V3 and V4 are smaller than angles between the vector Va and the other effective voltage vectors V1, V2, V5 and V6). That is, the direction of the vector Va is placed between directions of the vectors V3 and V4. The inverter IV is set in the operating state corresponding to the selected voltage vector V3 in the next control period. Then, when the plus or minus sign of the current error is changed to the other sign at a point P2, the determining unit 34 selects the other voltage vector V4 forming a smaller angle with the vector Va. The inverter IV changes the operating state corresponding to the vector V3 to the operating state corresponding to the voltage vector V4.

Then, when the current error is placed at a point P3 so as to again exceed the allowable range (i.e., the norm of the vector Edq becomes higher than the threshold Eth), the determining unit 34 selects one zero voltage vector V7. The inverter IV changes the operating state corresponding to the vector V4 to the operating state corresponding to the voltage vector V7. Therefore, in the same manner as the processing in the triangular wave comparison PWM control, the control device 20 can lengthen the period of the operating state corresponding to the zero voltage vector. Accordingly, the number of average changing times of the switching states in the inverter IV can be reduced.

Figure 4:
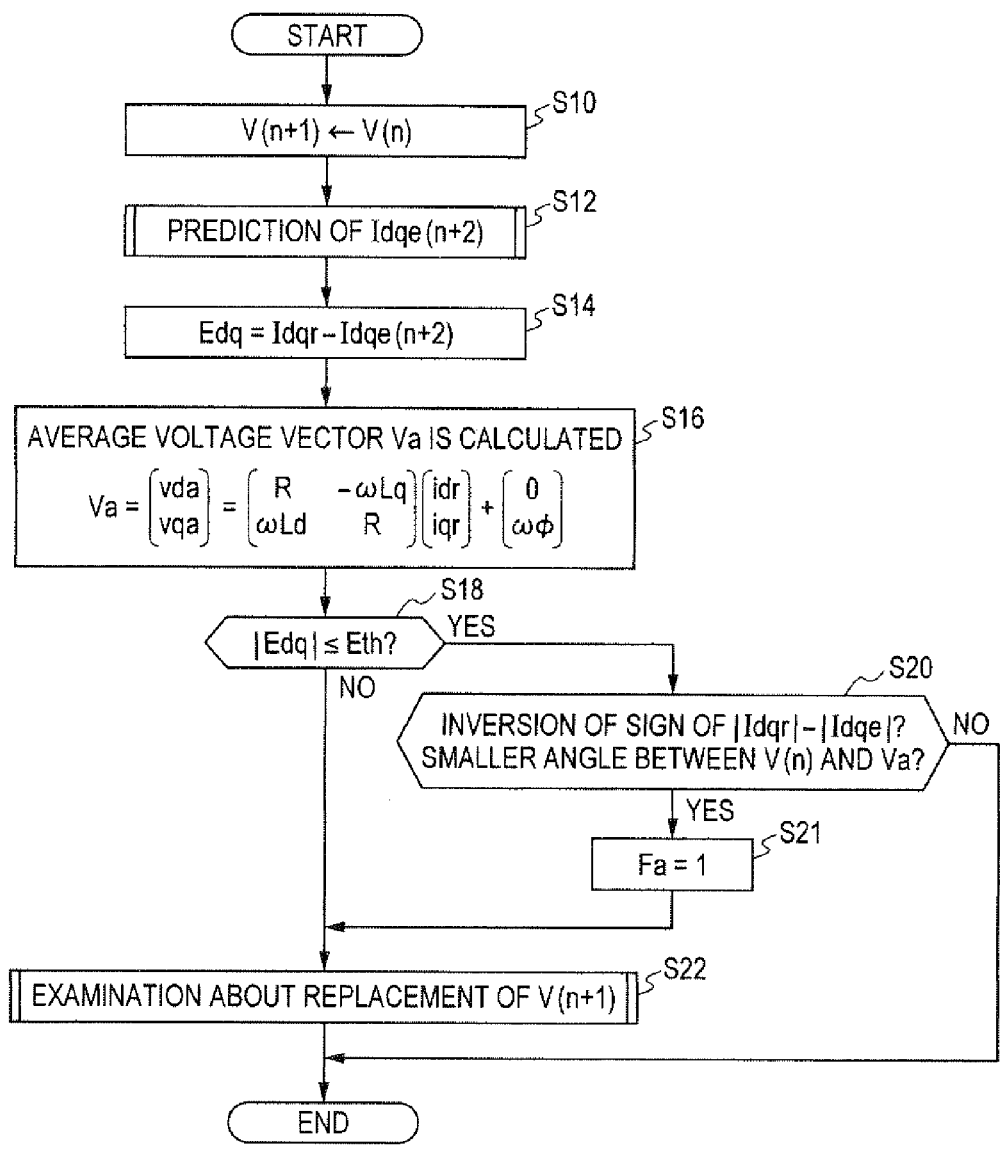
FIG. 4 is a flow chart showing the processing in the model prediction control according to the first embodiment.

FIG. 4 is a flow chart showing the processing in the model prediction control according to this embodiment. This processing is performed by the control device 20 every control period Tc, and each control period Tc is started at a renewing (or setting) timing. The inverter IV is set in an operating state corresponding to a voltage vector V(n) at the renewing timing of the present control period Tc(n), and this voltage vector V(n) is finally determined in the control device 20 in the preceding control period Tc(n−1) earlier than the present control period Tc(n) by one control period.

As shown in FIG. 4, at step S10, the predicting unit 33 provisionally sets a voltage vector V(n), indicating the present operating state actually set in the inverter IV in the present control period Tc(n), as a voltage vector V(n+1). The inverter IV is planned to be set in an operating state corresponding to the voltage vector V(n+1) at the renewing timing of the next control period Tc(n+1). Then, at step S12, the first predicting block 33b of the predicting unit 33 predicts a current vector Idqe(n+2) flowing through the generator 10 in the control period Tc(n+2), on the assumption that the inverter IV is set in the operating state corresponding to the voltage vector V(n+1) at the renewing timing of the next control period Tc(n+1). The control period Tc(n+2) is later than the next control period Tc(n+1) by the time length of one control period. To perform the prediction in the predicting block 33b, a second predicting block 33c predicts a current vector Idqe(n+1) flowing through the generator 10 in the control period Tc(n+1). The predicting block 33b performs the prediction by using the current vector Idqe(n+1).

This predicting process will be described in detail with reference to FIG. 5.

Figure 5:
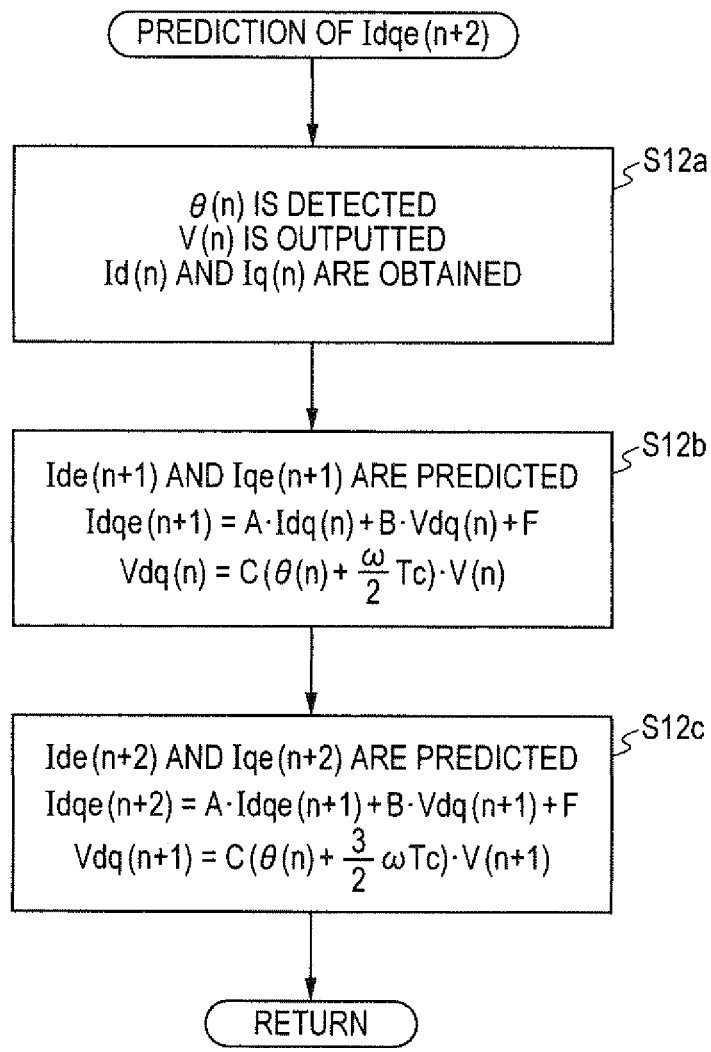
FIG. 5 is a flow chart showing the processing for predicting a current vector in the model prediction control shown in FIG. 4.

FIG. 5 is a flow chart showing the processing for predicting the current vector Idqe(n+2) performed in the predicting unit 33 according to this embodiment. As shown in FIG. 5, at step S12a, a rotational angle θ (n) expressed by electrical angle is detected, the voltage vector V(n) determined in the preceding control period Tc(n−1) is outputted to the control section 26 to set the inverter IV in the operating state corresponding to the voltage vector V(n) at the renewing timing of the present control period Tc(n), and the current Idq(n) (Id(n), Iq(n)) selected in the selecting block 33a is obtained. Further, to output the actual current Idqa(n) (Ida(n), Iqa(n)) to the selecting block 33a, phase currents Iu, Iv and Iw are detected by the sensor 16 at the renewing timing of the present control period Tc(n).

Thereafter, at step S12b, the second predicting block 33c predicts an alternating current Idqe(n+1)=(Ide(n+1), Iqe(n+1)) of the next control period Tc(n+1) on condition that the inverter IV is set in the operating state corresponding to the voltage vector V(n), by using the current Idq(n) of the selecting unit 33a, the voltage vector (Vd, Vq) of the converting unit 32 and the rotational speed ω(n) determined from the detected rotational angle θ (n). More specifically, discretization using the forward difference method is performed for the model expressed by the equations (c3) and (c4) to obtain discrete quantities in each of control periods, and the predicted current Idqe(n+1)=A·Idq(n)+B·Vdq(n)+F (A, B and F are coefficients) is calculated by using the discrete quantities. In this predicting calculation, the current (Ide(n), Iqe(n)) is used as an initial value, and a voltage vector defined on the dq rotational coordinate system is used. The voltage vector Vdq(n) defined on the dq rotational coordinate system is obtained by performing the dq conversion for the voltage vector V(n) defined on the fixed coordinate system by using the value θ(n)+ωTc/2. Therefore, Vdq(n)=C(θ(n)+ωTc/2)·V(n) is obtained. Although this dq conversion differs from the calculation based on the forward difference method, the dq conversion is performed to suppress the discrete error caused by the forward difference method.

Then, at step S12c, the first predicting block 33b predicts an alternating current Idqe(n+2)=(Ide(n+2) Iqe(n+2)) of the control period Tc(n+2), later than the present control period Tc(n) by two control periods, in the same manner as the predicting calculation performed at step S12b on the assumption that the inverter IV is set in the operating state corresponding to the voltage vector V(n+1) at the renewing timing of the next control period Tc(n+1). In this predicting calculation of the current Idqe(n+2), the predicted current Idqe(n+1) of the next current period Tc(n+1) calculated at step S12b is used as an initial value, and a voltage vector Vdq(n+1) defined on the dq rotational coordinate system is used. This voltage vector Vdq(n+1) is obtained by performing the dq conversion for the voltage vector V(n+1) defined on the fixed coordinate system by using the value θ (n)+3 ωTc/2. The predicted current Idqe(n+2)=A·Idqe(n+1)+B·Vdq(n+1)+F (A, B and F are coefficients) is obtained. The voltage vector Vdq(n)=C(θ(n)+3ωTc/2)·V(n+1) is obtained. Thereafter, the procedure returns to step S14 shown in FIG. 4.

A step S14, the determining unit 34 calculates a current error vector Edq=Idqr−Idqe(n+2) by subtracting the predicted current vector Idqe(n+2) from the instructed current vector Idqr set in the setting unit 24. Then, at step S16, the determining unit 34 calculates an average voltage vector Va=(Vda, Vqa) defined on the dq rotational coordinate system by modifying the equations (c1) and (c2). In this calculation, the differential operator p is removed from the equations (c1) and (c2), and the current vector Idq=(Id, Iq) is replaced with the instructed current vector Idqr=(Idr, Iqr). Therefore, the average voltage vector Va=(Vda, Vqa) is expressed by using equations (E1) and (E2).

$$Vda = R \cdot Idr - \omega \cdot Lq \cdot Iqr \quad (E1)$$

$$Vqa = \omega \cdot Ld \cdot Idr + R \cdot Iqr + \omega \cdot \phi \quad (E2)$$

Assuming that no ripple is generated in the phase currents even when the switching state of the inverter IV is changed, the average current flowing through the generator 10 is equal to the instructed current Idqr=(Idr, Iqr). Therefore, the average voltage vector Va denotes a voltage applied to the terminals of the generator 10 when the instructed current Idqr steadily flows through the generator 10.

Then, at step S18, the determining unit 34 judges whether or not the current error |Edq| (i.e., the norm of the current error vector Edq) is within the allowable range indicated by the threshold Eth. It is preferable that the threshold Eth is changeably set while depending on state quantities (e.g., the amplitude of each phase current, and the electrical angle rotational speed W of the generator 10. When the current error exceeds the allowable range (|Edq|>Eth), the procedure proceeds to step S22. In contrast, when the current error is within the allowable range (|Edq|≦Eth), at step S20, the determining unit 34 judges whether or not the plus or minus sign of the difference ||Idqr|−|Idqe|| between the norm|Idqr| of the instructed current vector Idqr and the predicted current vector Idqe is inverted to the other sign (first condition) in the present control period Tc(n) as compared with the sign) in the preceding control period Tc(n−1). This judgment is performed to judge whether or not the current error is placed at the point P2 shown in FIG. 3. When the sign is inverted, the determining unit 34 judges whether or not the present voltage vector V(n) already set at this time coincides with one of two effective voltage vectors which form smaller angles with the average voltage vector Va than angles between the vector Va and the other effective voltage vectors (second condition). When the voltage vector V(n) coincides with one of the two voltage vectors, the logical multiply of the first condition and the second condition is true (YES at step S20). In this case, at step S21, the determining unit 34 sets a state transition allowing flag Fa at "1", and the procedure proceeds to step S22. In contrast, in other cases (NO at step S20), the processing shown in FIG. 4 is ended in this control period Tc.

At step S22, although the voltage vector V(n+1) corresponding to the next operating state planned to be set in the inverter IV at the renewing timing of the next control period Tc(n+1) has been set at step S10 shown in FIG. 4, the determining unit 34 performs the processing for examining whether or not the voltage vector V(n+1) should be replaced with another voltage vector. When the determining unit 34 determines to replace the voltage vector V(n+1) with a specific voltage vector Vs, the determining unit 34 finally determines to set the inverter IV in an operating state corresponding to the specific voltage vector Vs. This processing will be described in detail with reference to FIG. 6. Then, the processing shown in FIG. 4 is finished in this control period Tc.

Therefore, on the assumption that the voltage vector V(n+1) coincides with the voltage vector V(n), a condition that the sign of the difference ||Idqr|−|Idqe|| is maintained in the next control period Tc(n+1) or a condition that the voltage vector V(n) differs from any of two effective voltage vectors forming smaller angles with the average voltage vector Va is satisfied while the current error |Edq| is within the allowable range Eth, the determining unit 34 selects the voltage vector V(n+1) coinciding with the voltage vector V(n), and the inverter IV is set in the operating state corresponding to this voltage vector V(n+1) in the next control period Tc(n+1).

In contrast, on the assumption that the voltage vector V(n+1) coincides with the voltage vector V(n), when the current error |Edq| is out of the allowable range Eth, the determining unit 34 performs the processing for examining whether or not the voltage vector V(n+1) should be replaced with another voltage vector. Further, on the assumption that the voltage vector V(n+1) coincides with the voltage vector V(n), on condition that the current error |Edq| is within the allowable range Eth, when the sign of the difference ||Idqr|−|Idqe|| is inverted while the voltage vector V(n) is one of two voltage vectors forming smaller angles with the average voltage vector Va, the determining unit 34 performs the processing for examining whether or not the voltage vector V(n+1) should be replaced with another voltage vector.

Figure 6:
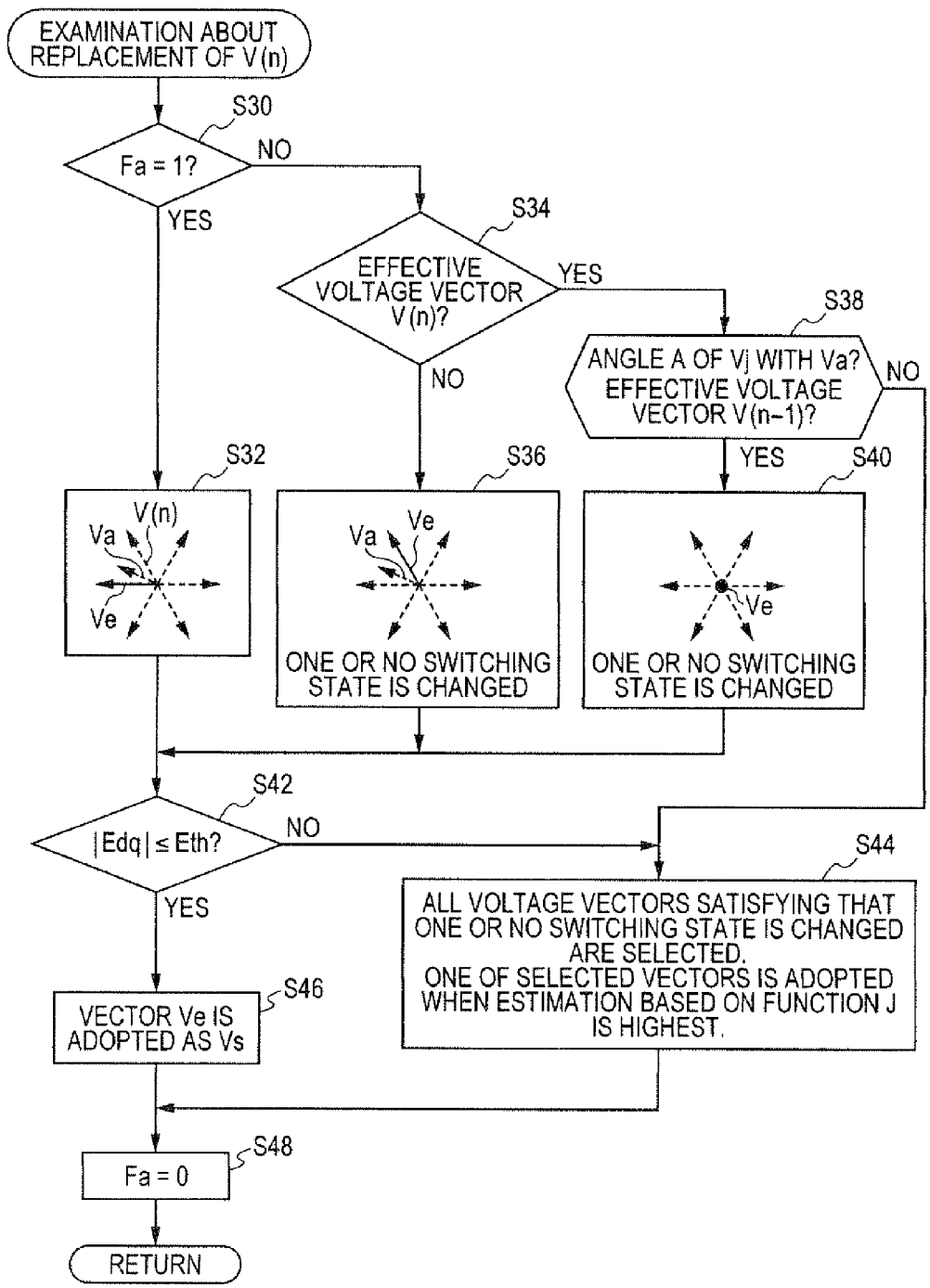
FIG. 6 is a flow chart showing the processing for examining the replacement of a voltage vector in the model prediction control shown in FIG. 4.

FIG. 6 is a flow chart showing the processing for examining the replacement of the voltage vector V(n+1) in the determining unit 34 according to this embodiment. As shown in FIG. 6, at step S30, the determining unit 34 judges whether or not the allowing flag Fa is set at "1". When the flag F is set at "1" (YES at step S30), the determining unit 34 detects that the voltage vector V(n+1) coinciding with the voltage vector V(n) is one of two voltage vectors V(n) forming smaller angles with the average voltage vector Va. Therefore, at step S32, the determining unit 34 selects a voltage vector, which differs from the present voltage vector V(n) forming a smaller angle with the average voltage vector Va and forms a smaller angle with the average voltage vector Va, as an examining voltage vector Ve. That is, the vectors V(n) and Ve form smaller angles with the vector Va. Then, the determining unit 34 gives priority to an examining operating state corresponding to the examining voltage vector Ve. The determining unit 34 sets this examining operating state having the priority as an object of the examination. In this examination, it is determined whether or not the voltage vector V (n+1) supposedly set at step S10 shown in FIG. 4 should be replaced with the examining voltage vector Ve. Assuming that the operating state corresponding to the voltage vector V(n) is changed to the examining operating state in the control period T(n+1), the number of phases, of which the switching states are changed to set the inverter IV in the examining operating state, is only one.

In contrast, when the allowing flag Fa is not set at "1" (NO at step S30), at step S34, the determining unit 34 judges whether or not the present voltage vector V(n) is one effective voltage vector. This process is performed to preferentially select one operating state corresponding to a specific effective voltage vector as an object of the examination when the current error is placed at the point P1 shown in FIG. 3. In the case of a negative judgment at step S34, at step S36, the control device 20 selects an examining voltage vector Ve which is one of effective voltage vectors forming smaller angles with the average voltage vector Va and indicates an examining operating state changed from the present operating state corresponding to the present voltage vector V(n) by a low switching state changing operation of the inverter IV. In this changing operation, the number of phases, of which the switching states are changed to set the inverter IV in the examining operating state, is one or less. The determining unit 34 gives priority to the examining operating state to set the examining operating state as an object of the examination. For example, effective voltage vectors V3 and V4 form smaller angles with the average voltage vector Va, and the present voltage vector V(n) is a zero voltage vector V0. In this case, the number of phases, of which the switching states are changed to set the inverter IV in the operating state corresponding to the voltage vector V3, is one (see FIG. 2A), while the number of phases, of which the switching states are changed to set the inverter IV in the operating state corresponding to the voltage vector V4, is two (see FIG. 2A). Therefore, the operating state corresponding to the voltage vector V3 is set as an object of the examination.

In contrast, in the case of an affirmative judgment at step S34, at step S38, the determining unit 34 judges whether or not one effective voltage vector Vj forming the angle of A (A≦20 degrees) with the average voltage vector Va exists in the voltage vectors V1 to V6 (first judgment), and it is judged whether or not the voltage vector V(n−1) set in the inverter IV just before being changed to the present voltage vector V(n) is one effective voltage vector (second judgment). The second judgment is performed to preferentially select one zero voltage vector when the current error is placed at the point P3 shown in FIG. 3. Further, when one effective voltage vector Vj forming the angle of A with the average voltage vector Va exists (first judgment), the effective voltage vector Vj hardly contributes to the production of the average voltage vector Va. Therefore, when the first judgment is affirmative, one zero voltage vector is preferentially selected.

When the first judgment and the second judgment are affirmative (i.e., the logical multiply of the first judgment and the second judgment is true) at step S38, at step S40, the determining unit 34 gives priority to an examining operating state corresponding to an examining zero voltage vector Ve on condition that the number of phases, of which the switching states are changed in a change of the present voltage vector V(n) to the examining zero voltage vector, is one or less. Then, the determining unit 34 sets the examining operating state as an object of the examination. For example, when the present voltage vector V(n) is the voltage vector V4, the examining operating state corresponding to the examining zero voltage vector V7 is set as an object of the examination. When the present voltage vector V(n) is the voltage vector V3, the examining operating state corresponding to the examining zero voltage vector V0 is set as an object of the examination.

After step S32, S36 or S40, the procedure proceeds to step S42. At step S42, a current vector Idqe(n+2)=(Ide(n+2), Iqe(n+2)) of the control period Tc(n+2), being later than the next control period Tc(n+1) by one control period, is predicted on the assumption that the inverter IV is set in the examining operating state, set as an object of the examination, at the renewing timing of the next control period Tc(n+1). Then, an error vector Edq(Idr−Ide(n+2), Iqr−Iqe(n+2)) between the instructed current vector Idqr=(Idr, Iqr) and the predicted current vector Idqe(n+2) is calculated, and it is judged whether or not the norm |Edq| of the error vector Edq is equal to or lower than the threshold Eth (|Edq|≦Eth?). When the relation |Edq|≦Eth is satisfied, at step S46, the determining unit 34 selects the examining voltage vector Ve, corresponding to the examining operating state set as an object of the examination, as a specific voltage vector Vs of the next control period Tc(n+1). That is, the voltage vector V(n+1) set at step S10 is replaced with the specific voltage vector Vs selected at step S46. Then, the procedure proceeds to step S48.

In contrast, in the case of a negative judgment at step S38 or S42, at step S44, all particular voltage vectors satisfying a first condition are selected from the voltage vectors V0 to V7. The first condition in the selection of each particular voltage vector is that the number of phases, of which the switching states are changed in a change of the voltage vector V(n) to the particular voltage vector, is one or less. Then, one of the particular voltage vectors satisfying a second condition is selected as a specific voltage vector Vs. The second condition is that the estimation based on the estimating function J for the selected particular voltage vector indicates the highest level among levels in the estimation for the particular voltage vectors. The estimation based on the function J(Edq) is indicated by the inner product value $Edq^2=(Idr−Ide)^2+(Iqr−Iqe)^2$ of the error vector Edq(Idr−Ide, Iqr−Iqe) between the instructed current vector Idqr(Idr, Iqr) and the predicted current vector Idqe(n+1)=(Ide(n+1), Iqe(n+1)). Then, the procedure proceeds to step S48.

At step S48, the allowing flag Fa is initialized to "0" so as not to allow the state transfer, and the processing shown in FIG. 6 is ended.

Therefore, when the voltage vector V(n) is one of two voltage vectors forming smaller angles with the average voltage vector Va while the current error |Edq| for the voltage vector V(n+1) provisionally set is within the allowable range Eth, one voltage vector coinciding with the other voltage vector forming a smaller angle with the average voltage vector Va is selected as a specific voltage vector Vs on condition that the current error |Edq| for the selected voltage vector is within the allowable range Eth. When the voltage vector V(n) is one zero voltage vector V0 or V7 while the current error |Edq| for the voltage vector V(n+1) provisionally set is out of the allowable range Eth, one effective voltage vector coinciding with one of two voltage vectors forming smaller angles with the average voltage vector Va is selected as a specific voltage vector Vs on condition that the number of phases, of which the switching states are changed, is one or less while the current error |Edq| for the selected voltage vector is within the allowable range Eth. When each of the voltage vectors V(n−1) and V(n) is one effective voltage vector while the current error |Edq| for the voltage vector V(n+1) provisionally set is out of the allowable range Eth and one effective voltage vector Vj forming the angle of A (A≦20 degrees) with the average voltage vector Va exists, one zero voltage vector is selected as a specific voltage vector Vs on condition that the number of phases, of which the switching states are changed, is one or less while the current error |Edq| for the selected voltage vector is within the allowable range Eth. In other cases, particular voltage vectors are selected on condition that the number of phases, of which the switching states are changed in the change to each particular voltage vector, is one or les, and one of the particular voltage vectors is selected as a specific voltage vector Vs on condition that the estimation based on the estimating function J for the selected operating state is the highest level. The inverter IV is set in the operating state corresponding to the specific voltage vector Vs in the next control period Tc(n+1) under control of the control unit 26.

Next, a method of obtaining an initial value for the prediction of the controlled variables will be described.

In the process at step S12a shown in FIG. 5, when the prediction of the alternating current in the next control period Tc(n+1) is performed after a sufficient period of time is elapsed from a change in at least one switching state of the inverter IV, the actual current Idqa(n)=(Ida(n), Iqa(n)) determined from the detected currents Iu, Iv and Iw of the sensor 16 in the present control period Tc(n) is used as an initial value for the prediction of the current Idqe(n+1)=(Ide(n+1), Iqe(n+1)) of the next control period Tc. In contrast, when the prediction of an alternating current in the next control period Tc(n+1) is performed just after a change in at least one switching state of the inverter IV, the ringing noise is superimposed onto the phase currents Iu, Iv and Iw so as to lower the precision in the detection of the actual current Idqa. Assuming that the actual current Idqa(n) is used as an initial value for the prediction of the current Idqe(n+1) just after a change in at least one switching state of the inverter IV, the lowering of the precision in the detection of the actual current Idqa causes the lowering of the precision in the prediction of the current Idqe(n+1) and the lowering of the precision in the current Idqe(n+2)=(Ide(n+2), Iqe(n+2)). Therefore, the controllability of the control device 20 in the model prediction control is lowered. Further, assuming that filtering is performed for the phase currents Iu, Iv and Iw to remove the ringing noise from the phase currents Iu, Iv and Iw, the phase of the actual current is delayed. Therefore, the speed of response in the model prediction control is lowered, so that the controllability of the control device 20 in the model prediction control is also lowered.

To solve the problem caused by the ringing noise superimposed onto the phase currents Iu, Iv and Iw just after a change in at least one switching state, in this embodiment, during a predetermined period of time Tth starting at a change in at least one switching state, the alternating current Idqe(n)=(Ide(n), Iqe(n)) already predicted in the preceding control period Tc(n−1) at step S12b shown in FIG. 5 is selected in the selecting block 33a and is used as an initial value for the prediction of the current Idqe(n+1)=(Ide(n+1) Iqe(n+1)), performed in the second predicting block 33b, in place of the actual current Idqa(n) determined from the detected values of the sensor 16. The current Idqe(n) is obtained by the prediction based on the actual current Idqa=(Ida, Iqa) of the unit 22 determined from the currents Iu, Iv and Iw which were detected most recently by the sensor 16 on condition that substantially no ringing noise is superimposed onto the phase currents Iu, Iv and Iw.

Figure 7:
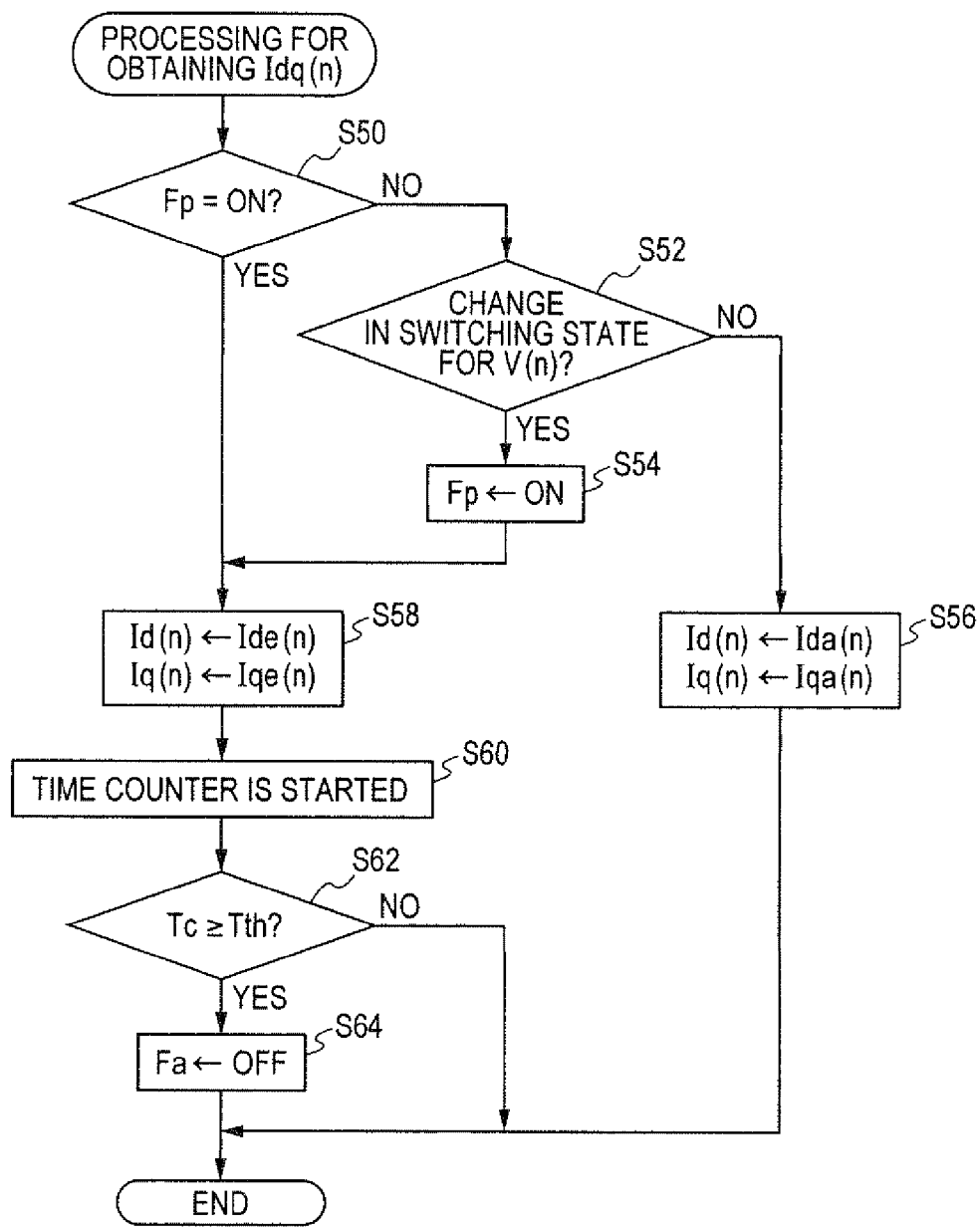
FIG. 7 is a flow chart showing the processing for obtaining a current to be used as an initial value for the current prediction.

FIG. 7 is a flow chart showing the processing for obtaining a current Idq(n) from the selecting block 33a to be used as an initial value for the prediction of a current Idqe(n+1). This processing is performed every control period Tc, and the inverter IV has been actually set in the operating state corresponding to the voltage vector V(n) in this control period Tc(n).

As shown in FIG. 7, at step S50, it is judged whether or not a current detection prohibiting flag Fp is set in an on state. When this prohibiting flag Fp has been set in the on state, it is prohibited to use the actual current Idq(n) as an initial value for the prediction of the current Idqe(n+1). In the case of a negative judgment at step S50, at step S52, it is judged whether or not at least one switching state has been changed because of the setting of the operating state corresponding to the voltage vector V(n) in the inverter IV in this control period Tc(n). That is, it is judged whether or not a ringing noise has been superimposed onto the actual current detected by the sensor 16 so as to lower the precision in the detect ion of the current value detected by the sensor 16. In the case of a negative judgment at step S52, at step S56, the actual current Idqa(n)=(Ida(n), Iqa(n)) based on the currents Iu, Iv and Iw detected by the sensor 16 in the present control period Tc(n) is selected in the selecting block 33a and is used as an initial value for the prediction of the current Idqe(n+1)=(Ide(n+1), Iqe(n+1)) of the next control period Tc(n+1). The predicted current Idqe(n+1) is used to determine a voltage vector V(n+1). Then, the processing shown in FIG. 7 is ended. Therefore, the current value detected by the sensor 16 is used for the process at step S12a shown in FIG. 5.

In contrast, in the case of an affirmative judgment at step S52, at step S54, the prohibiting flag Fp is changed to the on state. After the process at step S56 or in the case of an affirmative judgment at step S50, the procedure proceeds to step S58. At step S58, because the prohibiting flag is set in the on state, the current Idqe(n)=(Ide(n), Iqe(n)) already predicted at step S12b shown in FIG. 5 in the preceding control period Tc(n−1) is selected in the selecting block 33a and is used as an initial value for the prediction of the current Idqe(n+1)=(Ide(n+1), Iqe(n+1)) of the next control period Tc(n+1). Then, at step S60, the operation of a time counter is started to measure an elapsed time started at the start of the time counter. Then, at step S62, it is judged whether or not the counter value Ct indicating the elapsed time is equal to or longer than a threshold value Tth. This process is performed to detect a timing at which the prohibition on the use of the actual current Idqa(n) as an initial value for the prediction of the current Idqe(n+1) is withdrawn. When a predetermined period of time equal to the threshold value Tth is elapsed after a change in at least one switching state, the influence of ringing caused in the phase currents Iu, Iv and Iw by the change of the switching state can be sufficiently reduced. It is preferred that the threshold value Tth be set as shorter as possible on condition that it is assumed that the influence of ringing is sufficiently reduced after the elapsed time equal to the threshold value Tth. The threshold value Tth is set to be longer than one control period Tc.

In the case of an affirmative judgment at step S62, at step S64, the prohibiting flag Fp is changed to an off state, and the processing shown in FIG. 7 is ended. In contrast, in the case of a negative judgment at step S62, the processing shown in FIG. 7 is ended.

Therefore, the phase currents Iu, Iv and Iw detected by the sensor 16 is not used as an initial value for the prediction of the current Idqe(n+1) until the influence of ringing caused in the phase currents Iu, Iv and Iw is sufficiently reduced, and the current Idqe(n)=(Ide(n), Iqe(n)) already predicted is used as an initial value for the prediction of the current Idqe(n+1) during a predetermined period of time in which the influence of ringing exists. Accordingly, the control device 20 can preferably avoid the lowering of the precision in the prediction of the current Idqe(n+1).

Figure 8:
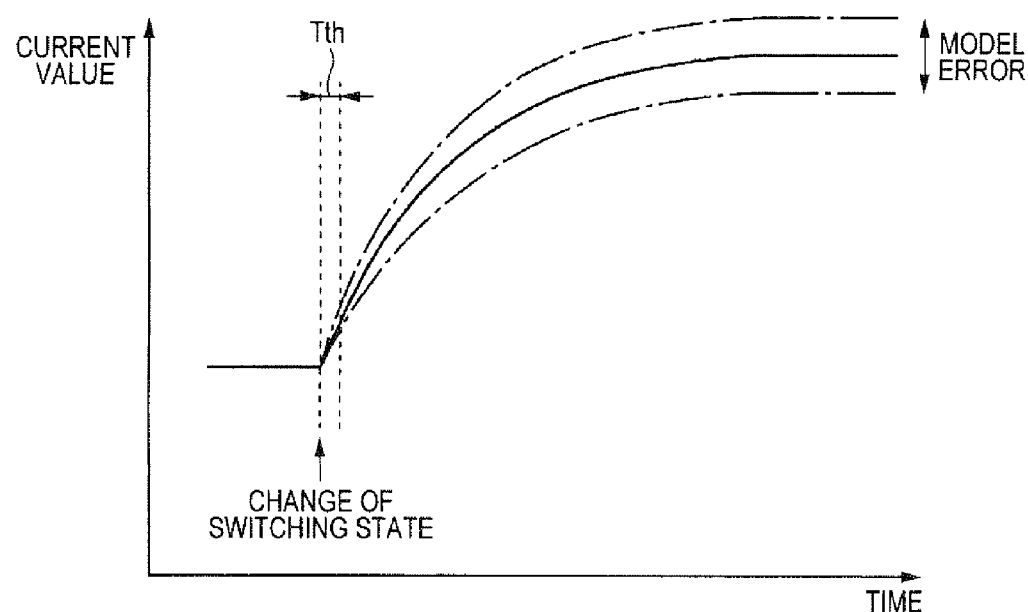
FIG. 8 is a time chart exemplarily showing the relation between a response time of current and a prohibiting period.

Especially, a period of time required to sufficiently reduce ringing after a change in at least one switching state is sufficiently shorter than a period of time (i.e., a current response time) required to settle or lead the phase currents Iu, Iv and Iw to regular values after a change in at least one switching state. Therefore, even when the predicted current Idqe(n)=(Ide(n), Iqe(n)) is used as an initial value for the prediction of the current Idqe(n+1), the precision in the prediction of the current Idqe(n+1) can be sufficiently heightened. FIG. 8 is a time chart exemplarily showing the relation between a response time of current and a prohibiting period Tth. As shown in FIG. 8, after at least one switching state is changed, each phase current is rapidly changed, and then being slowly changed while approaching a response time of current. The influence of a model error is increased after the change in the switching state. However, because the influence of a model error can be negligible for a short time just after the change in the switching state, the use of the predicted current Idqe(n) as an initial value for the prediction of the current Idqe(n+1) is useful when the influence of the model error is negligible.

Figure 9A:
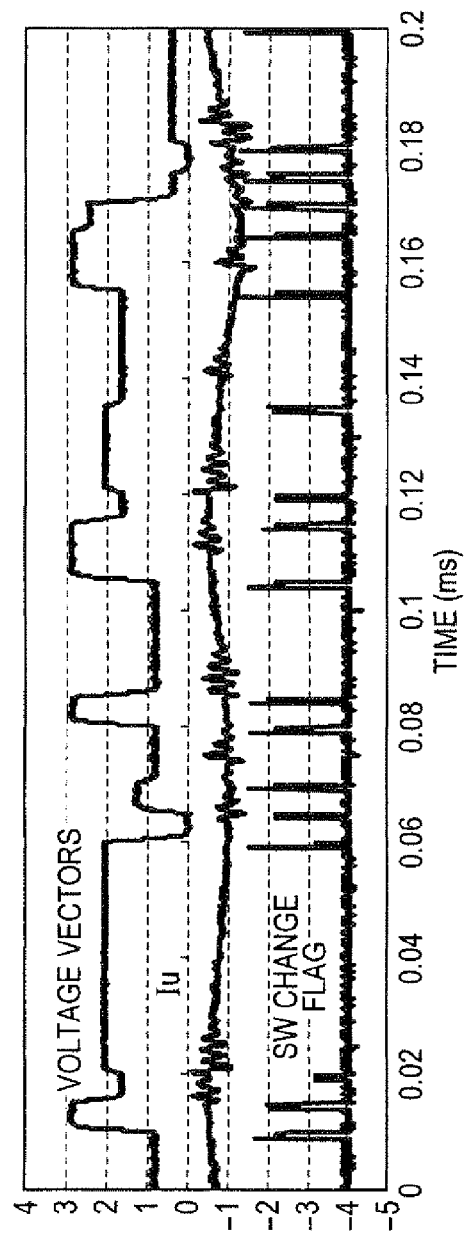
FIG. 9A is a time chart showing a transition of a voltage vector with a change of a phase current and an SW change flag according to a comparative prior art.
Figure 9B:
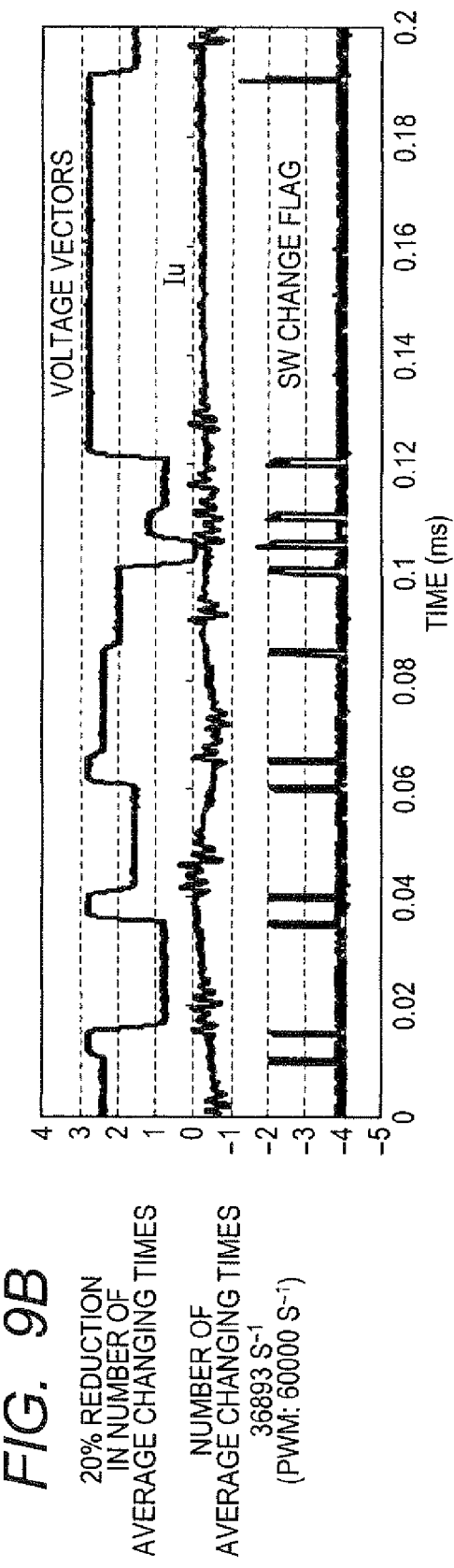
FIG. 9B is a time chart showing a transition of a voltage vector with a change of a phase current and an SW change flag according to the first embodiment.

FIG. 9A is a time chart showing a transition of the voltage vector with a change of the phase current Iu and an SW change flag according to a comparative prior art, while FIG. 9B is a time chart showing a transition of the voltage vector with a change of the phase current Iu and an SW change flag according to this embodiment. In the comparative prior art, the use of phase currents detected by the sensor 16 for the prediction of the current Idqe(n+1) is not prohibited. The SW change flag indicates a change in at least one switching state. Because the voltage vector and the SW change flag are indicated by signals outputted from a dedicated circuit, these are fluctuated. However, this fluctuation has no meaning, but the voltage vector changed in a step shape indicates a change of the voltage vector.

As shown in FIG. 9A, the number of average changing times of switching state is 46700 per second according to the comparative prior art. In contrast, as shown in FIG. 9B, the number of average changing times of switching state is reduced to 36893 per second according to this embodiment. That is, the number of average changing times is reduced by 20% as compared with that in the comparative prior art. Therefore, this reduction indicates that the switching operation of the switching elements inappropriately per formed due to the influence of ringing is suppressed. In addition, when the difference between the instructed current and the actual current in the triangular wave comparison PWM control is set to match with the difference in this embodiment, the number of average changing times of switching state in the triangular wave comparison PWM control is 60000 per second.

As described above, the predicting unit 33 sets phase currents Iu, Iv and Iw, actually detected from the generator 10, as an initial value to predict the current Idqe(n+2) on the basis of the initial value as an input parameter in the operating state determination of the determining unit 34, and predicts the current Idqe(n+2) as the input parameter in the predetermined period of time Tth, starting at a time when one operating state set in the electric power inverter circuit is changed to another one, by using the current Idqe(n+1), which has been predicted based on the phase currents Iu, Iv and Iw detected before the change of the operating state set in the inverter IV, as the initial value in place of a value of the controlled variable or the physical quantity detected in the predetermined period of time.

The current Idqe(n+2) predicted in the predicting unit 33 during the predetermined period of time Tth is set as another initial value which is used to predict another current Idqe(n+3) in a next control period Tc(n+1) during the predetermined period of time Tth as a next input parameter in the operating state determination of the determining unit 34. Therefore, the predicted current Idqe(n+2) can be used as the initial value for the prediction of the current Idqe(n+3).

The predicting unit 33 has the first predicting block 33b that predicts the current Idqe(n+2) acting as the input parameter in the operating state determination, and the second predicting block 33c that predicts the current Idqe(n+1), on condition that the inverter IV is set in the operating state corresponding to the voltage vector V(n), as the initial value used for the prediction of the first predicting block 33b in the predetermined period of time Tth.

To predict the current, to be set at a renewing timing of the operating state, with high precision, it is desired to obtain an initial value for the prediction at a obtaining time near to the renewing timing of the operating state to the utmost. However, because it is required to perform the current prediction before the renewing timing of the operating state, it is impossible or very difficult to obtain the initial value at the renewing timing or the obtaining time near to the renewing timing to the utmost. In this embodiment, because of the prediction in the second predicting block 33c, the initial value appropriate for the prediction in the first predicting block 33b can be obtained. Accordingly, the prediction of the current according to the model prediction control can be performed with high precision.

The prediction of the predicting unit 33 is performed every control period Tc, the determination of the determining unit 34 is performed every control period Tc, the control unit 26 sets the inverter IV in a specific operating state corresponding to a specific voltage vector Vs every control period Tc, the operating state corresponding to the voltage vector V(n+1) is determined by the determining unit 26 by using the current Idqe(n+2) predicted by the first predicting block 33b while using the current Idqe(n+1) predicted by the second predicting block 33c as the initial value used for the prediction of the first predicting block 33b, the inverter IV is set in the operating state corresponding to the voltage vector V(n+1) at a setting timing of the next control period Tc(n+1), and the first predicting block 33b predicts the current Idqe(n+2) which is intended to be set in the generator 10 at a time elapsed from the setting timing of the next control period Tc(n+1) by one control period.

The inverter IV is set in the operating state corresponding to the voltage vector V(n) determined by the determining unit 26 at a setting timing of the control period Tc(n) preceding the next control period Tc(n), and the second predicting block 33c predicts the current Idqe(n+1), set in the generator 10 at a time elapsed from the setting timing of the present control period Tc(n) by one control period, on the basis of the second operating state corresponding to the voltage vector V(n) by using the phase currents Iu, Iv and Iw detected at the setting timing of the present control period Tc(n) as an initial value.

Effects obtained in this embodiment will be described as follows.

During a predetermined period of time Tth in which the influence of ringing exists in the phase currents Iu, Iv and Iw flowing through the generator 10, the current Idqe(n) already predicted is used, in place of the phase currents Iu, Iv and Iw detected by the sensor 16, as an initial value for the prediction of the current Idqe(n+1). Therefore, even when ringing caused by a change in switching state is superimposed onto the phase currents Iu, Iv and Iw, the current Idqe(n+1) of the next control period Tc(n+1) can be predicted in the present control period Tc(n) without being influenced by the ringing. Accordingly, the precision in the prediction of the current Idqe(n+1) can be enhanced, and the controllability of the control device 20 for the switching elements of the inverter IV and the generator 10 in the model prediction control can be heightened.

Further, the predicted current (Ide(n+1), Iqe(n+1)) of the next current period Tc(n+1) used as an initial value for the prediction of the current (Ide(n+2), Iqe(n+2)) is predicted based on the current (Ide(n), Iqe(n)) already predicted when the influence of ringing exists, and is predicted based on the phase currents Iu, Iv and Iw detected by the sensor 16 when influence of ringing is sufficiently reduced. To use an appropriate detected value as an initial value for the prediction of the current (Ide(n+2), Iqe(n+2)), it is required to detect the value when the inverter IV is actually set in the operating state corresponding to the voltage vector V(n+1) in the next control period Tc(n+1). Therefore, it is impossible or very difficult to appropriately detect the value as an initial value for the prediction of the current (Ide(n+2), Iqe(n+2)). However, in this embodiment, because the predicted current (Ide(n+1), Iqe(n+1)) of the next current period Tc(n+1) is used as an initial value for the prediction of the current (Ide(n+2), Iqe(n+2)), the predicted current (Ide(n+1), Iqe(n+1)) can be an appropriate value as an initial value for the prediction of the current (Ide(n+2), Iqe(n+2)) while avoiding impossible or very difficult conditions.

Second Embodiment

Figure 10:
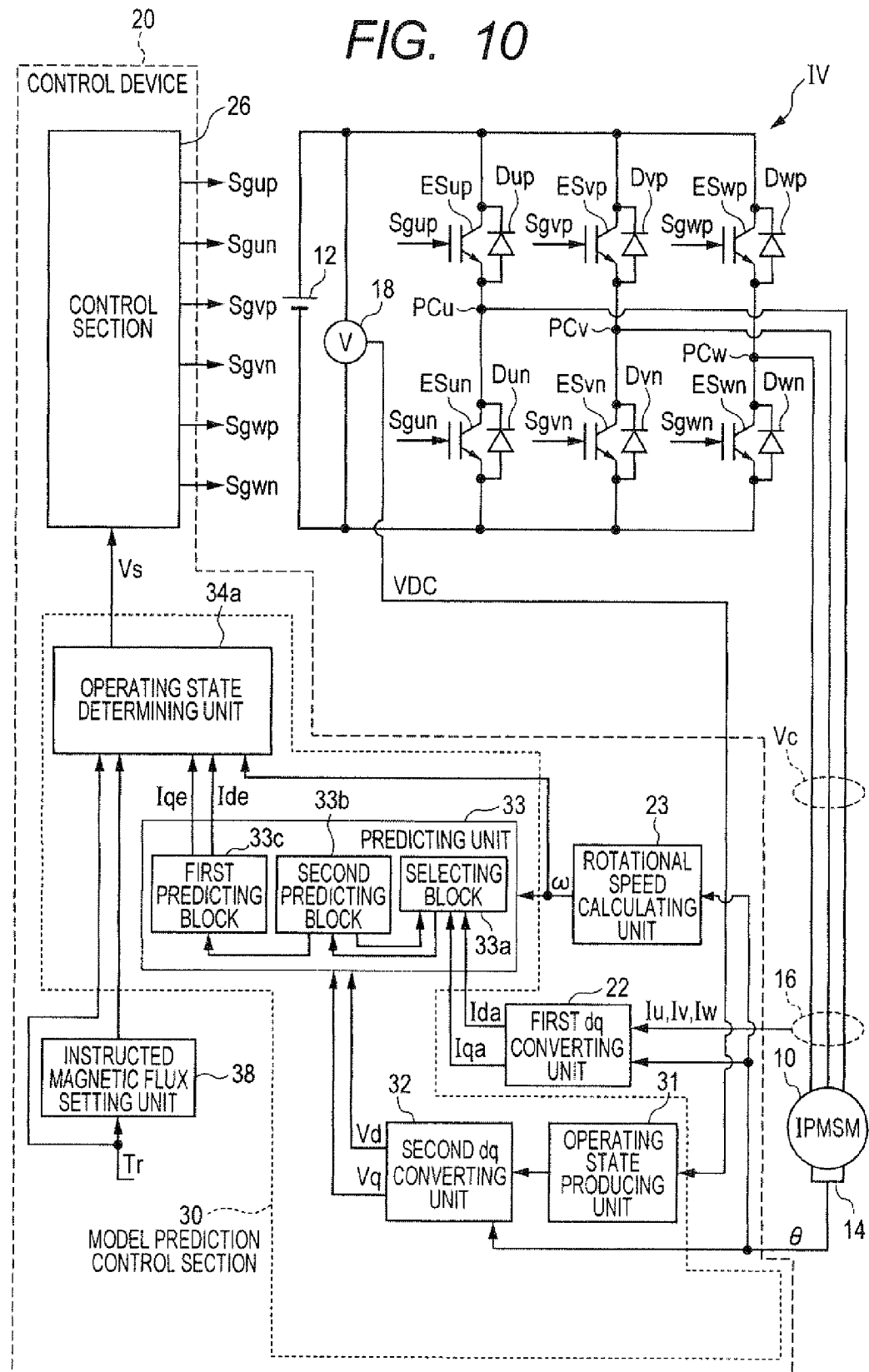
FIG. 10 is a view showing the structure of a control system having a control device according to the second embodiment of the present invention.

FIG. 10 is a view showing the structure of a control system having a control device 20A according to the second embodiment. As shown in FIG. 10, a control system has the battery 12, the inverter IV, the generator 10, and a control device 20A for receiving a target torque Tr, receiving detection values from the sensors 14 and 16 or physical values, and determining an operating state of the inverter IV such that the generator 10 appropriately generates a torque matching with the target torque Tr.

In this embodiment, a torque generated in the generator 10 and a magnetic flux induced in the generator 10 are set as controlled variable. An alternating current flowing through the generator 10 to generate and induce the torque and the magnetic flux in the generator 10 is set as a physical quantity. The control variable can be determined from the physical quantity. The control device 20A directly controls the current (i.e., the physical value) of the generator 10 to adjust the torque and the magnetic flux at a target torque and an instructed magnetic flux. Therefore, the control device 20A indirectly controls the torque and the magnetic flux of the generator 10 to adjust the torque and the magnetic flux at a target torque and an instructed magnetic flux.

The control device 20A differs from the control device 20 shown in FIG. 1 in that the control device 20A has a model prediction control section (i.e., a state determining section) 30A in place of the section 30 shown in FIG. 1. The section 30A has the predicting unit 33, a torque and magnetic flux predicting unit 37, an instructed magnetic flux setting unit 38 and a controlled state determining unit 34a.

The predicting unit 33 receives phase currents Iu, Iv and Iw and a rotational angle θ of the generator 10 from the sensors 16 and 14 every control period Tc. The control device 20A can calculate a torque and a magnetic flux of the generator 10 by using the phase currents Iu, Iv and Iw as input parameters. The predicting unit 33 predicts an alternating current Idqe(n+1)=(Ide(n+1) Iqe(n+1)) by using the currents Iu, Iv and Iw in the same manner as in the first embodiment.

The predicting unit 37 predicts a magnetic flux vector φe(φde, φqe) defined on the dq rotational coordinate system and a torque Te by using the predicted currents Ide and Iqe of the predicting unit 33 according to the following equations:

$$\phi d = Ld \cdot Id + \phi \quad (c5)$$

$$\phi q = Lq \cdot Iq \quad (c6)$$

$$T = P(\phi d \cdot Iq - \phi q \cdot Id) \quad (c7)$$

where the parameter P denotes the number of pole pairs. In this prediction, by replacing variables Id and Iq with the predicted currents Ide and Iqe, the variables φd, φq and T are calculated as the predicted magnetic flux components φde and φqe and the predicted torque Te.

The setting unit 38 has a magnetic flux map indicating the relation between a torque and a magnetic flux vector. The setting unit 38 receives a target torque Tr and sets an instructed magnetic flux vector φr(φdr, φqr) corresponding to the target torque Tr by referring to the map. The vector φr is set so as to satisfy the requirement of the maximum torque control and the like. In this maximum torque control, the maximum torque is generated in the generator 10 from the minimum current.

The determining unit 34a calculates a value of an estimating function J by using the predicted magnetic flux vector φe, the predicted torque Te, the instructed magnetic flux vector φr and the target torque Tr each time the producing unit 31 outputs one voltage vector. Then, the unit 34a determines a specific voltage vector Vs corresponding to the value of the function J, indicating the highest level of estimation, so as to set the inverter IV in a specific operating state corresponding to the specific voltage vector Vs in the next control period. More specifically, the torque difference ET=Tr−Te between the torques Tr and Te and the magnetic flux difference Eφ=φr−φe between the flux vectors φe and φr are calculated, and the value of the function J (ET, Eφ) is indicated by the sum $\alpha ET^2 + \beta E\phi^2$ of the squared torque difference $\alpha ET^2$ multiplied by a weighting factor α and the squared magnetic flux difference $E\phi^2$ multiplied by another weighting factor β. The unit 34a determines the voltage vector Vs corresponding to the minimum value of the function J among the values of the function J calculated by using the respective voltage vectors V0 to V7.

The weighting factors α and β are used to compensate the difference in magnitude between the torque and magnetic flux. For example, assuming that no weighting factor is used for the function J, when the value of the torque is higher than the value of the magnetic flux, the contribution of the error Eφ of the magnetic flux to the function J is lowered. In this embodiment, because of the use of the weighting factors α and β, the error Eφ of the magnetic flux and the error ET of the torque can equally contribute to the function J.

As described above, the predicted torque Te(n+1) and the predicted magnetic flux vector φe(n+1) used as input parameters of the estimating function J are calculated by using the actual phase currents Iu, Iv and Iw detected by the sensor 16 or the current Idqe(n) already predicted based on the actual phase currents Iu, Iv and Iw. Because the control system has no hardware component for directly detecting a torque and a magnetic flux of the generator 10, the phase currents Iu, Iv and Iw of the generator, from which a torque and a magnetic flux of the generator 10 can be determined, are detected, and the torque and magnetic flux of the generator 10 are calculated by using the currents Iu, Iv and Iw.

More specifically, to predict a torque Te and a magnetic flux vector φe which are generated and induced in the generator 10 on the assumption that the inverter IV is set in an operating state corresponding to a next voltage vector V(n+1) at a renewing timing of the next control period Tc(n+1), a current Idqe(n+2)=(Ide(n+2), Iqe(n+2)) is predicted on the assumption that the inverter IV is set in an operating state corresponding to the next voltage vector V(n+1) at the renewing timing of the next control period Tc(n+1), and the predicted torque Te and the predicted magnetic flux vector φe are determined by using the predicted current Idqe(n+2). In this case, the predicted current Idqe(n+1)=(Ide(n+1), Iqe(n+1)) of the generator 10 set at the renewing timing of the next control period Tc(n+1) is used as an initial value for the prediction of the current Idqe(n+2). As an initial value for the prediction of the current Idqe(n+1) of the generator 10 set just after a change in at least one switching state, in place of the actual phase currents Iu, Iv and Iw detected by the sensor 16 just after the change in at least one switching state, the current Idqe(n) already predicted in the second predicting block 33c at the renewing timing of the preceding control period Tc(n−1) by using the actual phase currents Iu, Iv and Iw detected before the change in at least one switching state.

Accordingly, because the control device 20A can control the phase currents Iu, Iv and Iw (i.e., physical values) of the generator 10 by using phase currents Iu, Iv and Iw detected by the sensor 16, the target torque Tr and the instructed magnetic flux φr, the control device 20A can indirectly control the torque and magnetic flux (i.e., controlled variables) of the generator 10.

Modifications

In the embodiments, during a predetermined period of time Tth in which the influence of ringing exists in the phase currents Iu, Iv and Iw of the generator 10, the current Idqe(n) already predicted is used, in place of the phase currents Iu, Iv and Iw detected by the sensor 16, as an initial value for the prediction of the current Idqe(n+1). However, when the influence of ringing was sufficiently reduced at a past prohibiting time before the present control period Tc(n), the control device 20 or 20A may store the phase currents Iu, Iv and Iw at the past prohibiting time in advance to use the actual current Idqa determined from the stored phase currents Iu, Iv and Iw as an initial value for the prediction of the current Idqe(n+1) when the influence of ringing exists in the phase currents Iu, Iv and Iw in the present control period Tc(n).

In the embodiments, the phase currents Iu, Iv and Iw are detected by the sensor 16 at the change time of each control period. However, the phase currents Iu, Iv and Iw may be detected at any time of each control period. In this case, the phase currents Iu, Iv and Iw can be detected as an initial value for the prediction of a current when the inverter IV is set in an operation state at the change time of the present control period.

In the embodiments, when the inverter IV is set in an operation state at the change time of a first present control period, controlled variables at the change time of a second control period later than the first control period by the time length of one control period are predicted. However, controlled variables at any time between the first and second control periods may be predicted.

The determination of the operating state set in the inverter IV is not limited to the method described in the embodiments. For example, even when the operating state set in the inverter IV is determined based on the predicted value and the instructed value of current denoting controlled variables, the operating state my be determined by comparing values of the estimating function J determined for all voltage vectors V0 to V7 produced in the setting unit 31.

In the embodiments, the input parameter of the estimating function J is the inner product value $Edq^2=(Idr-Ide)^2+(Iqr-Iqe)^2$ of the current difference (Idr−Ide, Iqr−Iqe) between instructed values Idr and Iqr of current (i.e., controlled variables) and predicted values Ide and Iqe of current (i.e., controlled variables). However, the input parameter of the estimating function J may be the sum $|Idr-Ide|+|Iqr-Iqe|$ of the component absolute differences $|Idr-Ide|$ and $|Iqr-Iqe|$ between components Idr and Iqr of the instructed current and components Ide and Iqe of the predicted current. That is, the input parameter of the estimating function J is arbitrary on condition that the level of estimation becomes low as the difference between instructed values Idr and Iqr of current (i.e., controlled variables) and predicted values Ide and Iqe of current (i.e., controlled variables) becomes large.

In the embodiments, only predicted values of current (i.e., controlled variables) in a first control period, later than one control period from a second control period, in which an operation state is set in the inverter IV, are used as input parameters for the determination of an operating state of the first control period. However, predicted values of current (i.e., controlled variables) in the first control period and control periods following the first control period, may be used as input parameters for the determination of an operating state of the first control period when an operation state is set in the inverter IV in the second control period earlier than the first control period by one control period.

In the embodiments, the inverter IV is representatively used as an electric power inverter circuit with a plurality of switching elements which sets a plurality of connecting points, being connected with respective terminals of an electric rotating machine represented by the motor generator 10, at respective electric potentials different from one another by selecting two switching elements or more from the switching elements and changing the state of each selected switching element to another one and adjusts controlled variables of the generator 10 represented by the phase currents flowing through the generator 10. However, the electric power inverter circuit in the present invention is not limited to the inverter IV. Any device with a plurality of switching elements can be selected as an electric power inverter circuit on condition that the device sets three connecting points or more, being connected with respective terminals of an electric rotating machine, at respective electric potentials different from one another by changing the state of each selected switching element to another one. For example, Japanese Patent First Publication No. 2006-174697 discloses an electric power inverter circuit which applies three electric potentials or more different from one another to respective terminals of an electric rotating machine.

In the embodiments, a torque and a magnetic flux of the generator 10 or phase currents of the generator 10 are set as controlled variables which are used to determine the operating state of the inverter IV by using an instructed value and predicted values. However, only a torque or only a magnetic flux of the generator 10 may be set as a controlled variable, or both a torque and a current of the generator 10 may be set as controlled variables. Further, when a current of the generator 10 is not used as a control led variable, a control device may control the inverter IV and the generator 10 by using a detected value of a sensor which detects information about the operation of the generator 10 other than a current of the generator 10.

In the embodiments, because the torque of the generator 10 is finally controlled to the target torque Tr regardless of whether the torque of the machine is predicted, the torque is adopted as the ultimate controlled variable of the electric rotating machine. However, a rotational speed or the like of the generator 10 may be adopted as the ultimate controlled variable.

As the electric rotating machine, the interior permanent magnet synchronous motor is used in the embodiments. However, any synchronous motor such as a surface magnet synchronous motor or a field winding synchronous motor may be used as the electric rotating machine. Further, any induction electric rotating machine such as an induction motor or the like may be used.

As a power source of the electric rotating machine, the present invention is not limited to a secondary battery. For example, a fuel cell may be used.

In the embodiments, the high-voltage battery 12 is adopted as the direct current source. However, output terminals of a converter boosting the output voltage of the battery 12 may be adopted.

What is claimed is:

1. A control device for controlling a plurality of switching elements of an electric power inverter circuit having a plurality of connecting points, which are connected with respective terminals of an electric rotating machine and are set at respective electric potentials different from one another, by selecting one switching element or more from the switching elements and by changing states of the selected switching elements and for controlling a controlled variable of the electric rotating machine, comprising:

a predicting unit that performs a prediction for the controlled variable of the electric rotating machine, when the electric power inverter circuit is set in one of a plurality of operating states to set the switching elements in states corresponding to the ope rating state;

an operating state determining unit that determines one of the operating states of the electric power inverter circuit as a determined operating state by using the predicted controlled variable and an instructed value of the controlled variable; and a control unit that controls the electric power inverter circuit to actually set the electric power inverter circuit in the determined operating state, wherein the predicting unit sets a value of the controlled variable, actually detected from the electric rotating machine, or a value of a physical quantity, from which the value of the control variable can be obtained and which is actually detected from the electric rotating machine, as an initial value to predict a first value of the controlled variable or the physical quantity on the basis of the initial value as an input parameter in the operating state determination of the operating state determining unit, and predicts the first value of the controlled variable or the physical quantity as the input parameter in a predetermined period of time, starting at a time when one operating state set in the electric power inverter circuit is changed to another operating state, by using a second value of the controlled variable or the physical quantity, which has been predicted based on a value of the controlled variable or the physical quantity detected before the change of the operating state set in the electric power inverter circuit, as the initial value in place of a value of the controlled variable or the physical quantity detected in the predetermined period of time.

2. The control device according to claim 1, wherein the first value of the controlled variable or the physical quantity predicted by the predicting unit in the predetermined period of time is set as another initial value which is used to predict another value of the controlled variable or the physical quantity in a next control period during the predetermined period of time as a next input parameter in the operating state determination of the operating state determining unit.

3. The control device according to claim 2, wherein the predicting unit comprises:
   a first predicting block that predicts the first value of the controlled variable or the physical quantity acting as the input parameter in the operating state determination; and
   a second predicting block that predicts the second value of the controlled variable or the physical quantity, when the electric power inverter circuit is set in the determined operating state, as the initial value used for the prediction of the first predicting block in the predetermined period of time.

4. The control device according to claim 3, wherein the prediction of the predicting unit is performed every control period, the determination of the operating state determining unit is performed every control period, the control unit sets the electric power inverter circuit in the determined operating state every control period, the operating state is determined by the operating state determining unit by using the first value of the controlled variable or the physical quantity predicted by the first predicting block while using the second value of the controlled variable or the physical quantity predicted by the second predicting block as the initial value used for the prediction of the first predicting block, the electric power inverter circuit is set in the operating state at a setting timing of a first control period, and the first predicting block predicts the controlled variable or the physical quantity which is set in the electric rotating machine at a time elapsed from the setting timing of the determined operation state by one control period.

5. The control device according to claim 4, wherein the electric power inverter circuit is set in a second operating state determined by the operating state determining unit at a setting timing of a second control period preceding the first control period, and the second predicting block predicts the controlled variable or the physical value, set in the electric rotating machine at a time elapsed from the setting timing of the second control period by one control period, on the basis of the second operating state of the electric power inverter circuit by using the value of the controlled variable or the physical quantity detected at the setting timing of the second control period as an initial value.

6. The control device according to claim 1, wherein the controlled variable is at least one of a torque of the electric rotating machine, a magnetic field of the electric rotating machine and an electric current flowing through the electric rotating machine.

7. The control device according to claim 1, wherein the switching elements are arranged so as to be able to connect each of the terminals of the electric rotating machine with any of a positive electrode and a negative electrode of a direct current power source, and the control unit controls the switching elements to changeably connect each terminal of the electric rotating machine with the positive or negative electrode of the direct current power source.

* * * * *